(12) United States Patent  (10) Patent No.: US 8,416,380 B2
Yamamoto et al.  (45) Date of Patent: Apr. 9, 2013

(54) LIQUID CRYSTAL DISPLAY PANEL

(75) Inventors: Akihiro Yamamoto, Osaka (JP); Yusuke Nishihara, Osaka (JP); Iori Aoyama, Osaka (JP); Tokio Taguchi, Osaka (JP); Masumi Kubo, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/146,630

(22) PCT Filed: Aug. 26, 2009

(86) PCT No.: PCT/JP2009/064870
§ 371 (c)(1),
(2), (4) Date: Aug. 1, 2011

(87) PCT Pub. No.: WO2010/087047
PCT Pub. Date: Aug. 5, 2010

(65) Prior Publication Data
US 2011/0279745 A1  Nov. 17, 2011

(30) Foreign Application Priority Data

Jan. 28, 2009 (JP) ................................ 2009-016503

(51) Int. Cl.
*G02F 1/1337* (2006.01)
(52) U.S. Cl. ........................................ 349/129; 349/108
(58) Field of Classification Search .................. 349/108, 349/129
See application file for complete search history.

(56) References Cited

U.S. PATENT DOCUMENTS

| 2004/0027503 A1 | 2/2004 | Tanaka |
| 2006/0152645 A1 | 7/2006 | Song et al. |
| 2006/0204744 A1 | 9/2006 | Hiraishi et al. |
| 2009/0185116 A1 | 7/2009 | Song et al. |
| 2009/0268133 A1 | 10/2009 | Yoshimi et al. |

FOREIGN PATENT DOCUMENTS

| JP | 2002-229062 A | 8/2002 |
| JP | 2005-517210 A | 6/2005 |
| JP | 2006-113208 A | 4/2006 |
| JP | 2006-251395 A | 9/2006 |
| JP | 2007-334308 A | 12/2007 |

*Primary Examiner* — Phu Vu
(74) *Attorney, Agent, or Firm* — Chen Yoshimura LLP

(57) ABSTRACT

Disclosed is a liquid crystal display panel which causes no gray scale inversion, even when obliquely viewed, and which realizes suppression of a gamma characteristics change and a chromaticity change. The liquid crystal display panel is made of a pair of substrates, at least one of which includes a plurality of pixel electrodes containing red, green and blue pixel electrodes, and a liquid crystal layer arranged between the pair of substrates. The liquid crystal layer is divided for each pixel into a first region and a second region, which have liquid crystal molecules different in the directions of inclination from each other. Both of the liquid crystal molecules positioned in the first region and the second region are oriented either vertically or horizontally when the pair of substrates is viewed in the front direction, and are oriented obliquely with respect to the substrate surface and symmetrically of each other when the pair of substrates is viewed in the cross-sectional direction. The liquid crystal layer has a smaller thickness in the regions corresponding to the blue pixel electrodes than those in the regions corresponding to the green and red pixel electrodes.

9 Claims, 20 Drawing Sheets

LIQUID CRYSTAL DISPLAY PANEL

TECHNICAL FIELD

The present invention relates to a liquid crystal display device. More specifically, the present invention relates to a liquid crystal display panel in which each pixel is divided into a plurality of regions that have liquid crystal molecules different in the directions of orientation from each other.

BACKGROUND ART

Liquid crystal display panels are display devices that can be driven with low power consumption, and they can easily be made lighter and thinner, and therefore, liquid crystal display panels are widely used for TVs, mobile phones, a monitor of personal computers and the like. Liquid crystal display panels are non-spontaneous light display panels, and display is typically controlled by electrically controlling the orientation of liquid crystal molecules in a liquid crystal layer disposed so as to be held between a pair of substrates as well as by adjusting the amount of light supplied from a backlight. However, because such a liquid crystal display panel controls the polarization state of light by an inclination angle of liquid crystal molecules in accordance with the liquid crystal applied voltage, they have a characteristic that the transmittance of light transmitting through the liquid crystal display panel is different depending on a viewing angle. Therefore, there has been a demand for improvements in the aspect that a liquid crystal display panel commonly has insufficient viewing angle characteristics.

In response to this, a technology of orientation division has been developed in which the inclination orientation of liquid crystal molecules is divided into a plurality of regions within a pixel. According to a liquid crystal display panel that has been applied with the orientation division, liquid crystal molecules are tilted to a plurality of directions different from each other in each pixel when voltage is applied to the liquid crystal layer, and therefore, viewing angle characteristics are improved. Further, each region in which liquid crystal molecules are divided into a plurality of regions so as to have a different inclination direction from each other is also called a domain, and the entire region that has been applied with the orientation division is called a multi-domain as well.

A liquid crystal display panel is usually provided with color filters of three colors that are red (R), green (G) and blue (B), and a color filter of each color is assigned to each pixel electrode. This enables color display in a liquid crystal display panel. As means of adjusting a color balance among red, green and blue, a liquid crystal layer thickness, for example, may be adjusted in accordance with the wavelength of a display color that is assigned to each pixel (see Patent Document 1, for example).

Further, when a liquid crystal display panel is in a vertical alignment mode, in recognizing an aspect that coloring occurs in a black display due to light leakage when the liquid crystal display panel is viewed in an oblique direction, it has been disclosed a method of adjusting the amount of retardation for light transmitting through each color region of liquid crystal cells in the thickness direction of the liquid crystal cells (see Patent Document 2, for example). Patent Document 2 discloses an example of adjusting the amount of retardation by changing a liquid crystal layer thickness for each color region, for example.

RELATED ART DOCUMENTS

Patent Documents

Patent Document 1: Japanese Patent Application Laid-Open Publication No. 2002-229062
Patent Document 2: Japanese Patent Application Laid-Open Publication No. 2007-334308

SUMMARY OF THE INVENTION

Problems to be Solved by the Invention

The present inventors have studied various liquid crystal display panels that have orientation division, especially liquid crystal display panels in which when viewed in a direction perpendicular to a display surface of the liquid crystal display panel (hereinafter also referred to as a front direction), the orientation direction of liquid crystal molecules is divided into four oblique directions that are symmetrical to each other, and furthermore, when viewed in a direction perpendicular to a cross-section of the liquid crystal panel (hereinafter also referred to as a cross-sectional direction), the orientation direction of liquid crystal molecules is divided obliquely with respect to the substrate surface and symmetrically to each other (hereinafter also referred to as a four domain orientation division). Then, the inventors focused on a change in display quality between when the liquid crystal display panel is viewed in the front direction and when viewed in oblique directions.

The present inventors found that according to a liquid crystal display panel that includes a liquid crystal layer of the four domain orientation division, when a viewer sees the liquid crystal display panel in oblique directions, he/she recognizes light that has been affected by the average characteristic of the respective liquid crystal molecules that are oriented in multiple directions, respectively, and therefore, there is no significant difference in the appearance of the display in any viewing direction, and a problem of gray scale inversion is resolved, for example, but there was still room for improvement in regard to problems of a change in gamma characteristics, which is gradation-luminance characteristics, and a chromaticity change.

The present invention was devised in light of the above-mentioned situation described above, and an object of the present invention is to provide a liquid crystal display panel in which gray scale inversion does not occur and a gamma characteristics change and a chromaticity change are suppressed even when viewed in oblique directions.

Means for Solving the Problems

The present inventors performed various studies on a gamma characteristics change as well as a chromaticity change when a viewing angle is changed from the front direction to oblique directions with respect to a liquid crystal display panel. As a result, the inventors discovered that, in the four-domain orientation division, the orientation directions of liquid crystal molecules are tilted in oblique directions as the liquid crystal display panel is viewed in the front direction, and therefore, the effective retardation of the liquid crystal molecules changes and a difference in gamma values (gradation values) occurs between when the liquid crystal display panel is viewed in the front direction and when viewed in oblique directions, and further discovered that a chromaticity change is caused by large differences among the changes in gradation values of the respective colors caused by such gamma characteristics changes in the ratios among gradation X (red), gradation Y (green), and gradation Z (blue) between when viewed in the front direction and when viewed in oblique directions.

The present inventors' further studies revealed that, in order to resolve this problem, by applying an orientation division (hereinafter also referred to as a two domain orientation division) such that when a liquid crystal display panel is viewed in the front direction, liquid crystal molecules are oriented in either the vertical direction or the horizontal direction, and when the liquid crystal display panel is viewed in the cross-sectional direction, liquid crystal molecules are oriented obliquely with respect to the substrate surface and symmetrically to each other, and by further making a liquid crystal layer thickness different for each region corresponding to red, green and blue in order to compensate the differences in the ratios among the gradation X, the gradation Y, and the gradation Z, it is possible to suppress the gamma characteristics changes as well as the chromaticity changes that are caused when a viewing angle is changed between the front direction and oblique directions. As a result, the present inventors have come to a realization that the above-mentioned problem can be solved, and therefore reached the present invention.

That is, the present invention is a liquid crystal display panel, including: a pair of substrates, at least one of which includes a plurality of pixel electrodes including red, green and blue pixel electrodes, and a liquid crystal layer disposed between the above-mentioned pair of substrates, wherein the above-mentioned liquid crystal layer is divided for each pixel into a first region and a second region that have liquid crystal molecules different in directions of inclination from each other, wherein when voltage equal to or higher than a threshold is applied, all liquid crystal molecules positioned in the above-mentioned first region and liquid crystal molecules positioned in the above-mentioned second region are oriented either vertically or horizontally when the above-mentioned pair of substrates is viewed in the front direction, and are oriented in directions oblique to a substrate surface and symmetrically to each other when the above-mentioned pair of substrates is viewed in a cross-sectional direction, and wherein the above-mentioned liquid crystal layer has a smaller thickness in a region corresponding to the blue pixel electrode than in a region corresponding to the green pixel electrode and than in a region corresponding to the red pixel electrode. A detailed description of the present invention will be made below.

The liquid crystal display panel of the present invention includes a pair of substrates, at least one of which includes a plurality of pixel electrodes including red, green and blue pixel electrodes, and a liquid crystal layer disposed between the above-mentioned pair of substrates. In the present specification, a "pixel electrode" means an electrode disposed so as to correspond to one of the colors used for a display, and a "red pixel electrode" means a pixel electrode disposed in a position overlapping with a red color filter, a "green pixel electrode" means a pixel electrode disposed in a position overlapping with a green color filter, and a "blue pixel electrode" means a pixel electrode disposed in a position overlapping with a blue color filter, for example. Here, a region partitioned by the above-mentioned pixel electrodes is also called a "pixel" in the present specification. Forming a plurality of pixels in a liquid crystal display panel enables high definition display. In a liquid crystal display panel of the present invention, voltage of a prescribed amount can be applied to a liquid crystal layer by forming pixel electrodes on one of the above-mentioned pair of substrates, and by forming a common electrode that is formed entirely on the other substrate of the above-mentioned pair of substrates regardless of the pixels, for example. A desired display color is achieved by adjusting the mix ratios of colors added by the three pixels of red, green and blue in the liquid crystal display panel of the present invention. Further, in the present specification, "red" means a wavelength component having the dominant wavelength in a range of 650 to 780 nm, "green" means a wavelength component having the dominant wavelength in a range of 510 to 570 nm, and "blue" means a wavelength component having the dominant wavelength in a range of 470 to 510 nm.

The above-mentioned liquid crystal layer is divided for each pixel into a first region and a second region that have liquid crystal molecules different in directions of inclination from each other. The liquid crystal display panel of the present invention is applied with the two domain orientation division, and the liquid crystal layer is divided into two kinds of regions, a first region and a second region, that have liquid crystal molecules different in the directions of inclination from each other. As means of applying the orientation division, there are means such as (1) means of forming bank-like protrusions, which have a certain length and have a convexity toward the liquid crystal layer, and are made of a dielectric material, on a surface of the pair of substrates that is in contact with the liquid crystal layer to divide a single pixel into two regions by the protrusions, (2) means of forming slits with a certain length in the pixel electrodes or in the common electrode to divide a single pixel into two regions by the slits, and (3) means of using a rubbing treatment, a light orientation treatment, or the like to differentiate orientations that are applied by an alignment film, which is formed on the surface of the above-mentioned pair of substrates in contact with the liquid crystal layer, for each domain to divide a single pixel into two regions by the borderlines of the regions that have liquid crystal molecules different in the directions of inclination from each other, for example.

When voltage equal to or higher than a threshold is applied, all of the liquid crystal molecules positioned in the above-mentioned first region and the second region are oriented either vertically or horizontally as the above-mentioned pair of substrates is viewed in the front direction, and are oriented in directions oblique to a substrate surface and symmetrically to each other as the above-mentioned pair of substrates is viewed in a cross-sectional direction. This way, the liquid crystal display panel of the present invention is provided with the two domain orientation division. Therefore, when the two domain orientation division is applied such that the longitudinal axis direction of the liquid crystal molecules is aligned in vertical directions, for example, even when a viewing angle is changed to a left or right oblique direction, it is possible to recognize a display having the same degree of gamma characteristics as viewed in the front direction, and the viewing angle characteristic in the horizontal direction is improved. Moreover, when the two domain orientation division is applied such that the longitudinal axis of the liquid crystal molecules is aligned in horizontal directions, for example, even when a viewing angle is changed to an oblique direction upward or downward, it is possible to recognize a display having the same degree of gamma characteristics as viewed in the front direction, and the viewing angle characteristic in the vertical direction is improved. Here, in the present specification, a vertical direction means a direction upward or downward with respect to a viewer's view point in a normal usage, and a horizontal direction means a direction left or right with respect to a viewer's viewpoint in a normal usage.

The above-mentioned liquid crystal layer has a smaller thickness in the regions corresponding to the blue pixel electrodes than in the regions corresponding to the green electrodes and also than in the regions corresponding to the red pixel electrodes. Light that transmits through the liquid crystal molecules has a different transmittance depending on its wavelength component due to the refractive index anisotropy (Δn) of liquid crystal molecules, and therefore, each color's intensity becomes different. Such a difference in transmittance is larger when the liquid crystal layer is viewed in oblique directions than when viewed in the front direction. In the present invention, the liquid crystal layer has a different thickness in each region corresponding to the color filter of each color, and this adjusts retardation that is added by the liquid crystal layer in order to reduce the differences in the transmittances among the respective colors between when viewed in the front direction and when viewed in oblique directions. Δn, which shows the refractive index anisotropy of liquid crystal molecules, usually shows a value near the green wavelength, however, the Δn value of the blue wavelength is in fact larger than the Δn value of the green wavelength or the Δn value of the red wavelength. Therefore, the liquid crystal layer has a smaller thickness in the region corresponding to the blue pixel electrode than in the region corresponding to the green pixel electrode and than in the region corresponding to the red pixel electrode in the present invention. This enables suppression of a chromaticity change. Further, such a suppression effect of a chromaticity change is only achieved when the two domain orientation division is applied, and a chromaticity change is hardly suppressed in an embodiment that has been applied with the four domain orientation division even when the retardation added by the red, green and blue liquid crystal layers is adjusted, for example. Moreover, in a mono-domain embodiment in which the orientation division is absent, even when a viewing angle characteristic in one direction is improved by adjusting the thickness of the liquid crystal layer, gray scale inversion occurs in the other directions, and therefore, a viewing angle characteristic is not improved as a whole, and such a case is not preferred.

As long as the configuration of the liquid crystal display panel according to the present invention includes these components, other components may or may not be included, and optical elements such as a retarder, a polarizing plate and the like may also be attached to the above-mentioned pair of substrates, for example. Further, it is possible to create a liquid crystal display device used for TVs, mobile phones, a monitor of personal computers or the like by further adding peripheral circuits or the like such as a backlight and a driver to the liquid crystal display panel of the present invention.

A detailed description will be made below regarding preferred embodiments of the liquid crystal display panel of the present invention.

It is preferable that the above-mentioned liquid crystal layer have a smaller thickness in the region corresponding to the green pixel electrode than in the region corresponding to the red pixel electrode. The above-mentioned Δn, which shows the refractive index anisotropy of liquid crystal molecules, is larger in the Δn value of the green wavelength than in the Δn value of the red wavelength. Therefore, as a result of making the thickness of the liquid crystal layer smaller in the regions corresponding to the green pixel electrodes than in the regions corresponding to the red pixel electrodes, it is possible to eliminate the difference of transmittance among the respective colors more effectively, and to achieve a larger effect of suppressing a chromaticity change.

It is preferable that when the pair of substrates is viewed in the front direction, liquid crystal molecules in the above-mentioned liquid crystal layer be oriented in a vertical direction, and the shape of the above-mentioned pixel electrodes be longer in a horizontal direction than in vertical directions. In the above-mentioned present invention, a viewing angle characteristic in horizontal directions can be improved when applying the two domain orientation division in which liquid crystal molecules within the liquid crystal layer are oriented in a vertical direction. But, here, by designing the pixel electrodes to be longer in the horizontal direction than in the vertical direction, loss of transmittance can be suppressed in regions near the pixel electrodes' edges in an up-down direction (vertical direction) compared to when the pixel electrodes are designed to be longer in a vertical direction than in a horizontal direction. Such a loss of transmittance is caused by an orientation disorder of liquid crystal molecules, and in a case of the two domain orientation division in which the pixel electrode is divided by a borderline in a horizontal direction as the liquid crystal display panel is viewed in the front direction, the orientation is likely to become disorderly in the pixel electrode's edges in a vertical direction.

It is preferable that the liquid crystal molecules of the above-mentioned liquid crystal layer be oriented in horizontal directions as the above-mentioned pair of substrates is viewed in the front direction, and the shape of the above-mentioned pixel electrode be longer in a vertical direction than in a horizontal direction. In the above-mentioned present invention, a viewing angle characteristic in vertical directions can be improved when applying the two domain orientation division in which liquid crystal molecules within the liquid crystal layer are oriented in horizontal directions. But, contrary to the above-mentioned embodiment in which the shape of a pixel electrode is designed longer in a horizontal direction than in a vertical direction, the orientation is likely to become disorderly in the pixel electrode's edges in a left-right direction (horizontal direction) in a case of the two domain orientation division in which the pixel electrode is partitioned by a borderline in a vertical direction as the liquid crystal display panel is viewed in the front direction. Therefore, according to the present embodiment, loss of transmittance can be better suppressed in the regions near the pixel electrode's edges in a horizontal direction compared to when pixel electrodes are designed longer in a horizontal direction than in a vertical direction.

It is preferable that when the above-mentioned pair of substrates is viewed in the front direction, liquid crystal molecules in the above-mentioned liquid crystal layer be oriented in the vertical directions, and the above-mentioned liquid crystal display panel include a diffusion sheet to block light incident from oblique directions to a substrate surface and to guide light incident from a direction perpendicular to the substrate surface in a vertical direction. It is also preferable that when the above-mentioned pair of substrates is viewed in the front direction, liquid crystal molecules of the above-mentioned liquid crystal layer be oriented in the horizontal directions, and the above-mentioned liquid crystal display panel include a diffusion sheet to block light incident from oblique directions to a substrate surface and to guide light incident from a direction perpendicular to the substrate surface in a horizontal direction. In the above-mentioned liquid crystal display panel of the present invention, a gamma shift characteristic and a chromaticity change can be improved in either a horizontal direction or a vertical direction, but according to the present embodiment, it is possible to further achieve the effects of the improvements in a gamma shift characteristic and a chromaticity change in the other unimproved direction (vertical direction or horizontal direction) as well, and therefore achieving good display in all directions. Additionally, when an angle directly in front of the liquid crystal display panel is called 0°, a "perpendicular direction" here not only means 0°, but also includes a range of about 0° to 20°. Moreover, "oblique directions" mean angles other than the perpendicular direction and the horizontal direction.

Further, it is also possible to consider not applying the two domain orientation division, and only using the above-mentioned diffusion sheets that have a light guiding characteristic to guide light in all directions, but in this case, the front luminance and the front contrast could be lowered compared to cases of improving either one of the vertical direction or the horizontal direction by using the two domain orientation division, and improving the other direction of either the vertical direction or the horizontal direction by using the above-mentioned diffusion sheet that has a light guiding characteristic. In addition, the thickness becomes larger because of the above-mentioned diffusion sheets, and this causes problems such as occurrence of a blurred image, occurrence of moire (stripe pattern), an increase in cost due to an increase in the number of components, and lowering of mass-productivity.

It is preferable that the above-mentioned liquid crystal layer thickness be set such that a value of a liquid crystal layer thickness in the region corresponding to blue pixel electrode d(B) divided by a liquid crystal layer thickness in the region corresponding to the green pixel electrode d(G) is 0.7 to 0.9. When the two domain orientation division is applied, average values of Δu'v', which is a change in u'v' values based on CIE1976 Lu'v' color matching function, become equal to or lower than 0.02 by setting the thickness of the liquid crystal layer corresponding to each color of blue and green to such a number range. Therefore, a chromaticity change becomes hardly recognized when viewed in a direction 45° to the left or a direction 45° to the right of the front direction, compared to when viewed in the front direction.

It is preferable that the above-mentioned liquid crystal layer thickness be set such that a value of a liquid crystal layer thickness in the region corresponding to blue pixel electrode d(B) divided by a liquid crystal layer thickness in the region corresponding to the red pixel electrode d(R) is 0.7 to 0.9. When the two domain orientation division is applied, average values of Δu'v', which is a change in u'v' values based on CIE1976 Lu'v' color matching function, become equal to or lower than 0.02 by setting the thickness of the liquid crystal layer corresponding to each color of blue and red to such a number range. Therefore, a chromaticity change becomes hardly recognized when viewed in a direction 45° to the left or a direction 45° to the right of the front direction, compared to when viewed in the front direction.

It is preferable that the above-mentioned liquid crystal layer thickness be set such that a value of a liquid crystal layer thickness in the region corresponding to the blue pixel electrode d(B): a liquid crystal layer thickness in the region corresponding to the green pixel electrode d(G): a liquid crystal layer thickness in the region corresponding to the red pixel electrode d(R) is 0.7 to 0.9:1:("0.3*d(B)+0.82" to "0.3*d(B)+0.86"). A more preferable value is 0.7 to 0.9:1: "0.3*d(B)+0.84". When the two domain orientation division is applied, average values of Δu'v', which is a change in u'v' values based on CIE1976 Lu'v' color matching function, becomes equal to or lower than 0.02 by setting the thickness of the liquid crystal layer corresponding to each color of blue, green and red to such a number range. Therefore, a chromaticity change becomes hardly recognized when viewed in a direction 45° to the left or a direction 45° to the right of the front direction, compared to when viewed in the front direction.

Effects of the Invention

In the liquid crystal display panel of the present invention, the two domain orientation division is used, and the thickness of the liquid crystal layer corresponding to each color of red, green and blue is adjusted, and therefore, it is possible to achieve a liquid crystal display panel in which gray scale inversion does not occur, and a gamma characteristics change and a chromaticity change are suppressed even when viewed in oblique directions.

DETAILED DESCRIPTION OF EMBODIMENTS

Embodiments will be provided below to describe the present invention more specifically with reference to the figures, but the present invention is not limited to these embodiments.

Embodiment 1

Figure 1:
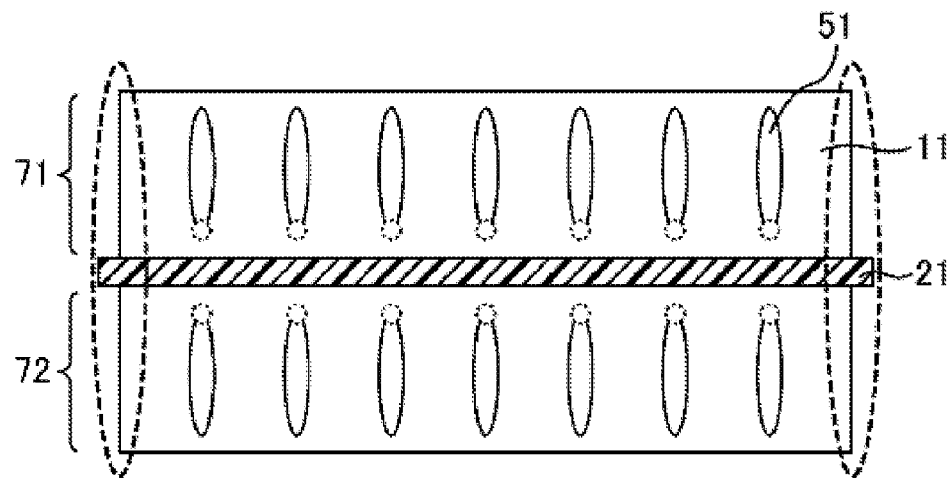
FIG. 1 is a schematic plan view showing the configuration of one of pixel electrodes included in a liquid crystal display panel of Embodiment 1.
Figure 2:
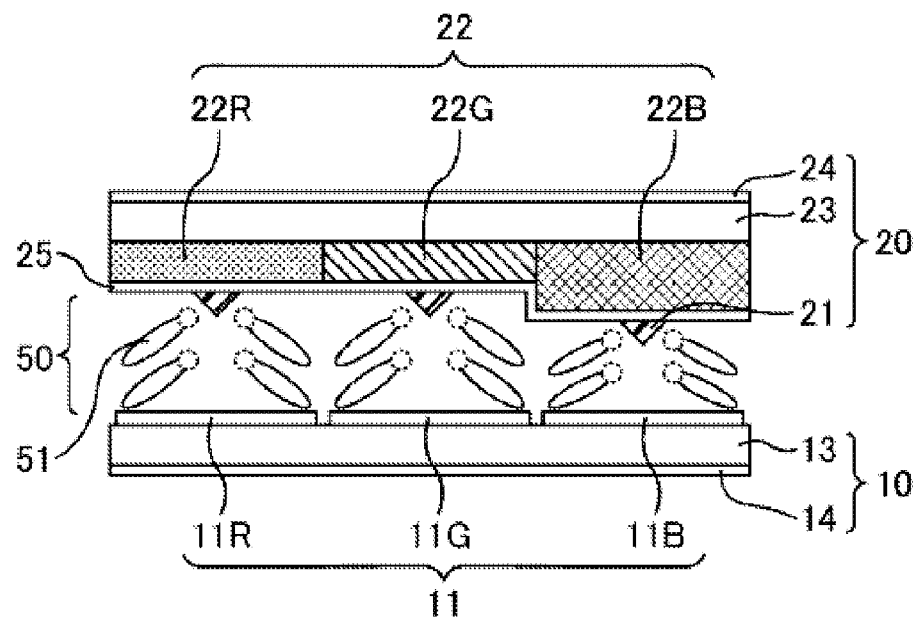
FIG. 2 is a schematic cross-sectional view of the liquid crystal display panel of Embodiment 1, and shows a cross-section including three pixels that are red (R), green (G) and blue (B).

FIG. 1 is a schematic plan view showing a configuration of one of pixel electrodes included in a liquid crystal display panel of Embodiment 1. FIG. 1 also shows the orientation direction of liquid crystal molecules when the liquid crystal display panel is viewed in a front direction. FIG. 2 is a schematic cross-sectional view of the liquid crystal display panel of Embodiment 1, and shows a cross-section including three pixels that are red (R), green (G) and blue (B). FIGS. 1 and 2 both show a state where voltage equal to or higher than a threshold is applied to a liquid crystal layer.

As shown in FIG. 2, the liquid crystal display panel of Embodiment 1 includes a pair of substrates 10 and 20 that is made of an active matrix substrate 10 and a color filter substrate 20, and a liquid crystal layer 50 disposed between the pair of substrates 10 and 20. In Embodiment 1, the active matrix substrate 10 has a structure including a polarizing plate 14, a supporting substrate 13 made of a glass or the like, conductive members such as various wires, semiconductor elements and pixel electrodes 11 formed on the supporting substrate 13, and an alignment film laminated in this order toward the liquid crystal layer 50. In Embodiment 1, the color filter substrate 20 has a structure including a polarizing plate 24, a supporting substrate 23 made of a glass or the like, color filters 22, a common electrode 25, and an alignment film laminated in this order toward the liquid crystal layer 50. The color filters 22 are made of a red color filter 22R, a green color filter 22G, and a blue color filter 22B.

Among the pair of substrates 10 and 20 included in the liquid crystal display panel of Embodiment 1, the active matrix substrate 10 has a plurality of rectangular pixel electrodes 11, which have a long side in the horizontal direction (direction same as a left-right direction) and a short side in the vertical direction (direction same as an up-down direction) disposed in lines next to each other vertically and horizontally, and they constitute a matrix pattern as a whole as shown in FIG. 1. A region partitioned by a single pixel electrode 11 becomes a region corresponding to a single pixel.

As shown in FIG. 2, a plurality of the pixel electrodes 11 included in the liquid crystal display panel of Embodiment 1 are designed to include a red pixel electrode 11R, a green pixel electrode 11G, and a blue pixel electrode 11B, and the respective pixel electrode 11 of each color are disposed in positions overlapping with the respective color filter 22 of that color. The red pixel electrode 11R is disposed so as to overlap with the red color filter 22R to control a red display, for example. Similarly, the green pixel electrode 11G is disposed so as to overlap with the green color filter 22G to control a green display. The blue pixel electrode 11B is disposed so as to overlap with the blue color filter 22B to control a blue display. It is preferable that the material of the pixel electrodes 11 have transparency, and a metal oxide film such as ITO (Indium Tin Oxide) and IZO (Indium Zinc Oxide) are suited, for example.

As shown in FIG. 1, when the respective pixel electrodes 11 are viewed in the front direction, a bank-like protrusion (hereinafter also referred to as a rib) 21 made of a dielectric material is disposed so as to cut across the pixel electrode 11 in the center in a horizontal direction. As shown in FIG. 2, the ribs 21 are formed on the color filter substrate 20. A region of the liquid crystal layer 50 corresponding to one of the pixel electrodes 11 is divided into two regions that are a first region 71 and a second region 72 by the ribs 21 and by the outer periphery (edge) of the pixel electrode 11. The ribs 21 are made of an organic resin material having insulating properties, and it is possible to tilt a group of liquid crystal molecules 31 that are located close to the ribs 21 toward the ribs 21. Therefore, every one of the liquid crystal molecules 51 is oriented such that one end of the liquid crystal molecule 51 is pointing toward the rib 21 in the respective regions that have been divided in such a manner. As a result, when the pair of substrates 10 and 20 is viewed in the front direction, the respective liquid crystal molecules 51 are oriented so as to have their long side in a vertical direction as well as in parallel with each other as shown in FIG. 1. Meanwhile, as shown in FIG. 2, when the pair of substrates 10 and 20 is viewed in a cross-sectional direction, the respective liquid crystal molecules 51 are oriented obliquely to surfaces of the pair of substrates 10 and 20 and symmetrically to each other by the borderlines of the divided regions. Additionally, the cross-sectional shape of the ribs 21 is not limited to triangle as shown in FIG. 2, and may be rectangular, trapezoid, a parabolic mountain shape or the like, for example. The ribs 21 can be formed by applying a resin material onto the entire common electrode 25 by a spin-coating method, and then patterning it into a desired shape by a photolithography method, for example. A phenol novolac type material or the like can be used as the material for the ribs 21.

The liquid crystal layer 50 of the Embodiment 1 is applied with the two domain orientation division by the ribs 21, and it is possible to achieve display characteristics equivalent to when viewed in the front direction even when a viewer tilts his/her viewing angle in a direction divided by the ribs 21, that is, in the left or right direction when the pair of substrates 10 and 20 is viewed in the front direction. Here, a dotted circle drawn on one end of the liquid crystal molecules 51 in FIGS. 1 and 2 indicates the end that is located on the side closer to a viewer among two ends of the liquid crystal molecule 51.

In Embodiment 1, the color filters 22 are made of color filters including three primary colors of red, green and blue, and are designed such that a single color filter 22 corresponds to a single pixel. Accordingly, color display is controlled per pixel, and good color display can be achieved. Moreover, a black matrix that is formed using a black resin or the like may also be disposed among the color filters 22 of the respective colors, and the black matrix can prevent color mixture and light leakage that occur among the respective color filters 22.

In Embodiment 1, the color filters 22 are designed to have a different film thickness per color. Specifically, the film thickness of the green color filter 22G and the red color filter 22R is substantially same, and the film thickness of the blue color filter 22B is larger than the film thickness of the green color filter 22G and than the film thickness of the red color filter 22R. Therefore, the liquid crystal layer 50 has a different thickness in each region where the pixel electrode 11 of each color is overlapping with the color filter 22 of each color. According to Embodiment 1, the thickness of the liquid crystal layer 50 is substantially same in the region corresponding to the red pixel electrode 11R and in the region corresponding to the green pixel electrode 11G, and is smaller in the region corresponding to the blue pixel electrode 11B than in the region corresponding to the red pixel electrode 11R and in the region corresponding to the green pixel electrode 11G.

The amount of retardation that will be added to light transmitting through the liquid crystal layer 50 depends on the thickness of the liquid crystal layer 50. Therefore, according to the configuration of Embodiment 1, the retardation that will be added to light transmitting through the liquid crystal layer 50 corresponding to the red pixel electrode 11R and the retardation that will be added to light transmitting through the liquid crystal layer 50 corresponding to the green pixel electrode 11G are substantially a same size, and the retardation that will be added to light transmitting through the liquid crystal layer 50 corresponding to the blue pixel electrode 11B is smaller than the retardation that will be added to light transmitting through the liquid crystal layer 50 corresponding to the red pixel electrode 11R and also smaller than the retardation that will be added to light transmitting through the liquid crystal layer 50 corresponding to the green pixel electrode 11G. According to Embodiment 1, after a gamma characteristics change is suppressed by applying the two domain orientation division, the retardation that will be added in accordance with the thickness of the liquid crystal layer 50 is appropriately adjusted per color. Therefore, it is possible to reduce a gap in the difference of transmittance among the respective colors in accordance with a wavelength dependency of the liquid crystal molecules 51 between when viewed in the front direction and when viewed in oblique directions (left-right direction), and it is possible to greatly suppress a chromaticity change between when viewed in the front direction and when viewed in oblique directions (left-right direction).

In Embodiment 1, the thickness of the liquid crystal layer 50 in a region corresponding to each color is adjusted by the thickness of the color filters 22, but it is also possible to perform the adjustment by a method of using a transparent resin layer or the like that is different from the color filters 22 instead of using the thickness of the color filters 22, or by a method such as a method of adjusting the thickness of the color filters 22 and also using a transparent resin layer or the like, for example. Furthermore, besides an embodiment in which the thickness of the liquid crystal layer 50 is adjusted on the color filter substrate 20 side, an embodiment in which the liquid crystal layer thickness is adjusted on the active matrix substrate 10 side may be used as well. Such a method may be a method in which a transparent resin layer such as an interlayer insulating film, which has the thickness corresponding to each pixel color, is disposed on the active matrix substrate 10 side, a method of disposing the color filters 22 themselves on the active matrix substrate 10 side, or the like, for example.

The common electrode 25 is an electrode that is formed on the entire color filters 22 regardless of each color's borderlines of the color filters 22, and enables application of a prescribed amount of voltage to the liquid crystal layer 50 by being disposed such a way as to sandwich the liquid crystal layer 50 together with the pixel electrodes 11. A material similar to the one used for the pixel electrodes 11 can be used as a material of the common electrode 25.

The liquid crystal layer 50 is filled with a liquid crystal material that has a characteristic of orienting in a certain direction when voltage equal to or higher than a threshold is applied. When using the above-described ribs and slits of the pixel electrodes, which will be described later, it is preferable to use a nematic liquid crystal material having negative dielectric constant anisotropy as a liquid crystal material for the liquid crystal layer 50 of Embodiment 1. A nematic liquid crystal material having negative dielectric constant anisotropy is a liquid crystal material that is oriented in a direction perpendicular to a substrate surface when voltage equal to or lower than a threshold voltage is applied, and is oriented in a direction horizontal to the substrate surface when voltage equal to or higher than the threshold voltage is applied. Therefore, the liquid crystal display panel of Embodiment 1 can be an alignment system called the Vertical Alignment (VA) mode, and specifically the Multi-domain Vertical Alignment (MVA). Further, when the VA mode or the MVA mode are used, as for an alignment film disposed on the respective surfaces of the pair of substrates 10 and 20 that are in contact with the liquid crystal layers 50, it is preferable to use a vertical alignment film for tilting the liquid crystal molecules that are close to the alignment films in the vertical direction relative to surfaces of the pair of substrates 10 and 20. A material used for the liquid crystal layer of Embodiment 1 is not limited to a material used in the VA mode or the MVA mode, and a material used in the Twisted Nematic (TN) mode, the Electrically Controlled Birefringence (ECB) mode or the like may also be used.

The polarizing plate 14 that is included in the active matrix substrate 10 and the polarizing plate 24 that is included in the color filter substrate 20 may include a polarizing film for only transmitting polarization among natural light that oscillates in a certain direction (direction of the polarizing axis), and may include a protection film for protecting the polarizing film that is attached to both surfaces or one surface of the polarizing film, for example. A Poly Vinyl Alcohol (PVA) type film that has been absorbed with iodine complex or dichroic pigment, or the like can be used as the polarizing film, and a Tri Acetyl Cellulose (TAC) film or the like can be used as the protection film. A retarder film such as a λ/4 plate and a λ/2 plate may also be attached to the polarizing plate as necessary. When the respective polarizing axises of the above-mentioned polarizing plate 14 and the above-mentioned polarizing plate 24, are adjusted so as to be in a direction perpendicular to each other, a normally black display mode is possible when the orientation system of the VA mode or the MVA mode is used.

Figure 3:
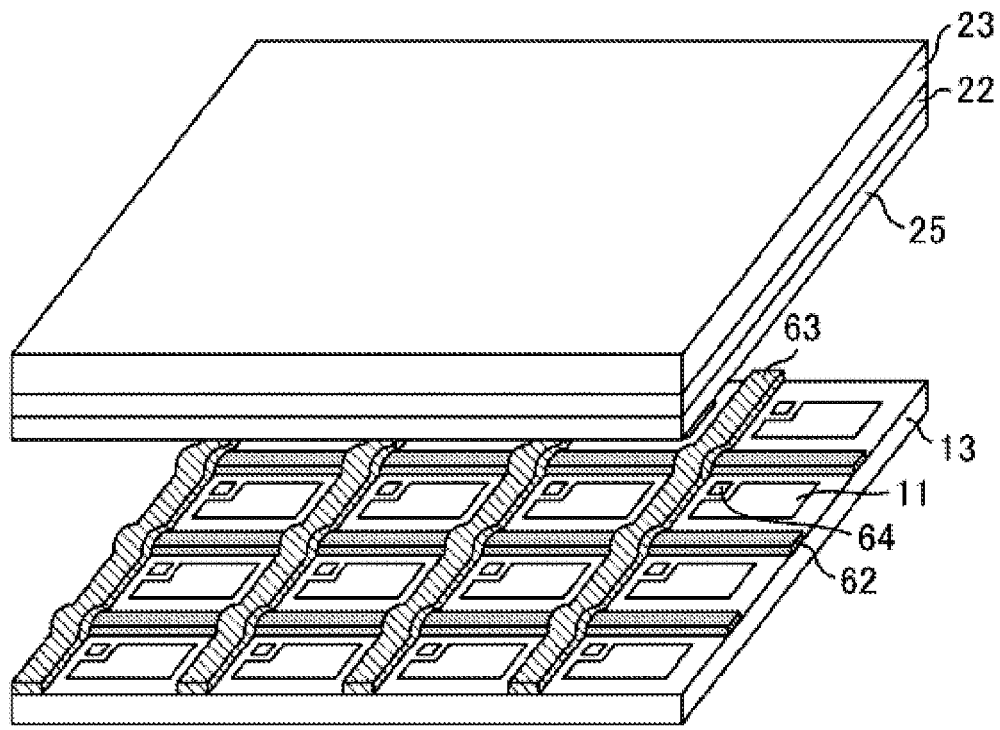
FIG. 3 is a schematic exploded perspective view showing the structure of the liquid crystal display panel of Embodiment 1.

The configuration of the active matrix substrate 10 will be described more specifically. FIG. 3 is a schematic exploded perspective view showing the configuration of the liquid crystal display panel according to Embodiment 1. As shown in FIG. 3, a plurality of wires are formed around the pixel electrodes 11 so as to surround the pixel electrodes 11. Gate signal wires 62 are disposed horizontally and source signal wires 63 are disposed vertically, for example. A thin film transistor (TFT) 64 is disposed as a switching element in the intersection of the gate signal wire 62 and the source signal wire 63, and gate voltage applied to the gate signal wires 62 controls a timing of when source signals are written in the pixel electrodes 11. The TFT 64 is a three-terminal type field-effect transistor, and includes a semiconductor layer as well as three electrodes that are a gate electrode, a source electrode and a drain electrode. The pixel electrodes 11, the gate signal wires 62 and the source signal wires 63 are disposed on different layers, respectively, through insulating films, preventing electric connection between them.

The active matrix substrate 10 may further include an auxiliary capacitance wire for keeping signal voltage that is written in the pixel electrodes 11. It is preferable from a conductivity and reliability point of view to use a metal with a low resistance and a high melting point, such as aluminum (Al), silver (Ag), tantalum nitride (TaN), titanium nitride (TiN), and molybdenum nitride (MoN), as materials for the gate signal wires 62, the source signal wires 63, the auxiliary capacitance wire, and for the gate electrode, the source electrode and the drain electrode included in the TFT 64.

As described above, orientations of the respective liquid crystal molecules 51 are divided by the ribs 21, which extend in a left-right direction (horizontal direction), and by the edges of the pixel electrodes 11 in Embodiment 1. Therefore, among a plurality of the liquid crystal molecules 51 that are overlapping with the pixel electrodes 11, the orientation is likely to be disorderly in the liquid crystal molecules positioned in regions (dotted elliptic mark in FIG. 1) that are overlapping with ends of the pixel electrodes 11, and loss of transmittance could be caused in these regions. In response to this, the liquid crystal display panel of Embodiment 1 is designed such that the pixel electrodes 11 are longer in a horizontal direction than in a vertical direction. Therefore, even when the liquid crystal molecules 51 are orientated vertically, that is, when the orientation division is applied by disposing the ribs 21 so as to cut across the pixel electrodes 11 horizontally, it is possible to suppress loss of transmittance due to an orientation disorder caused at the ends of the pixel electrodes 11, compared to when the pixel electrodes 11 are designed to be longer in a vertical direction than in a horizontal direction.

Further, when the pixel electrodes 11 are designed to be longer in a horizontal direction than in a vertical direction, it is preferable from a display controlling point of view that the red, green and blue pixel electrodes be vertically positioned adjacent to each other. Moreover, in relation to this, it is preferable that gate signals transmitting through the gate signal wires 62 be adjusted so as to be driven at three times the speed of when the red, green and blue pixel electrodes 11 are aligned in a horizontal direction, and it is preferable that the number of the source signal wires 63 be reduced to one third of the number of the source signal wires 63 of when the red, green and blue pixel electrodes 11 are horizontally aligned.

Embodiment 2

Figure 4:
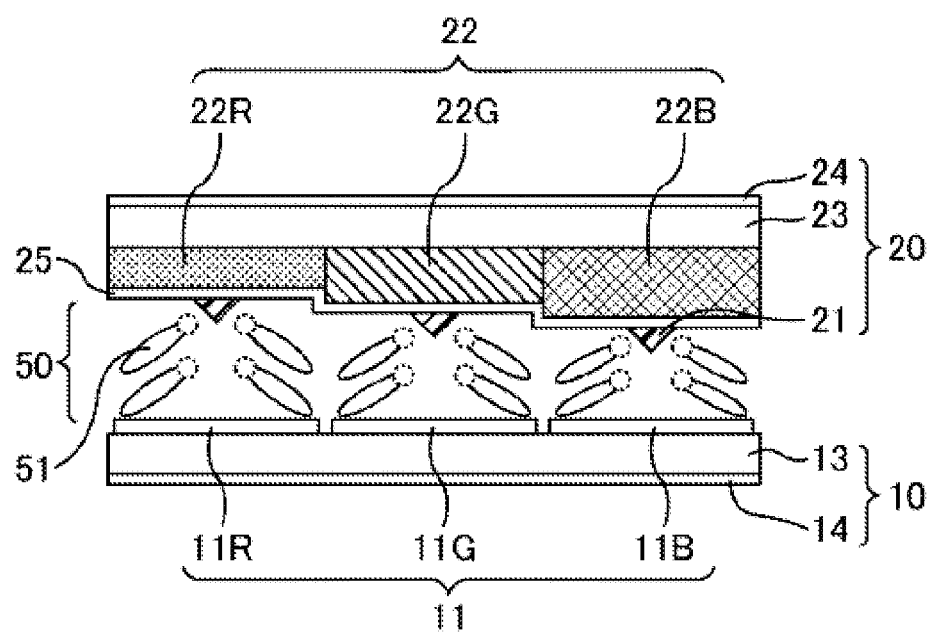
FIG. 4 is a schematic cross-sectional view showing a liquid crystal display panel of Embodiment 2, and shows a cross-section including three pixels that are red (R), green (G) and blue (B).

FIG. 4 is a schematic cross-sectional view showing a liquid crystal display panel of Embodiment 2, and shows a cross-section including three pixels that are red (R), green (G), and blue (B). The liquid crystal display panel of Embodiment 2 is different from Embodiment 1 in an aspect that the film thickness of the green color filter 22G is larger than the film thickness of the red color filter 22R, and the film thickness of the blue color filter 22B is larger than the film thickness of the green color filter 22G, but everything else is similar to the liquid crystal display panel of Embodiment 1.

In Embodiment 2, the film thickness of the green color filter 22G is larger than the film thickness of the red color filter 22R, and the film thickness of the blue color filter 22B is larger than the film thickness of the green color filter 22G, and therefore, the thickness of the liquid crystal layer 50 is smaller in the region corresponding to the green pixel electrode 11G than in the region corresponding to the red pixel electrode 11R, and is smaller in the region corresponding to the blue pixel electrode 11B than in the region corresponding to the green pixel electrode 11G. Accordingly, the retardation that will be added to light transmitting through the liquid crystal layer 50 corresponding to the green pixel electrode 11G becomes smaller than retardation that will be added to light transmitting through the liquid crystal layer 50 corresponding to the red pixel electrode 11R, and retardation that will be added to light transmitting through the liquid crystal layer 50 corresponding to the blue pixel electrode 11B becomes smaller than retardation that will be added to light transmitting through the liquid crystal layer 50 corresponding to the green pixel electrode 11G.

Δn, which indicates refractive index anisotropy of the liquid crystal molecules 51, is typically larger in blue than in green, and is larger in green than in red (red<green<blue), and therefore, when the liquid crystal layer thickness in a blue wavelength is designed to be smaller than the liquid crystal layer thickness in a green wavelength, and the liquid crystal layer thickness in a green wavelength is designed to be smaller than the liquid crystal layer thickness in a red wavelength, it is possible to reduce the differences in transmittance among these respective colors between when viewed in the front direction and when viewed in oblique directions, and to further suppress a change in chromaticity between when viewed in the front direction and when viewed in oblique directions (left or right direction) compared to Embodiment 1.

Embodiment 3

Figure 5:
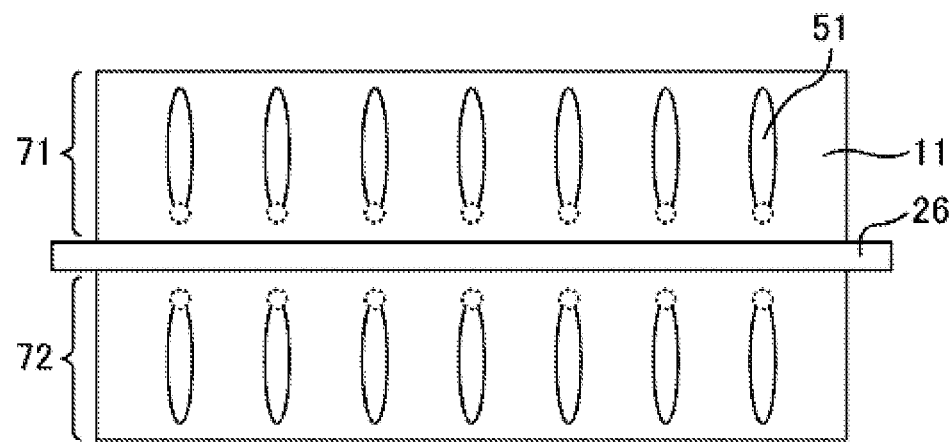
FIG. 5 is a schematic plan view showing the configuration of one of pixel electrodes included in a liquid crystal display panel of Embodiment 3.
Figure 6:
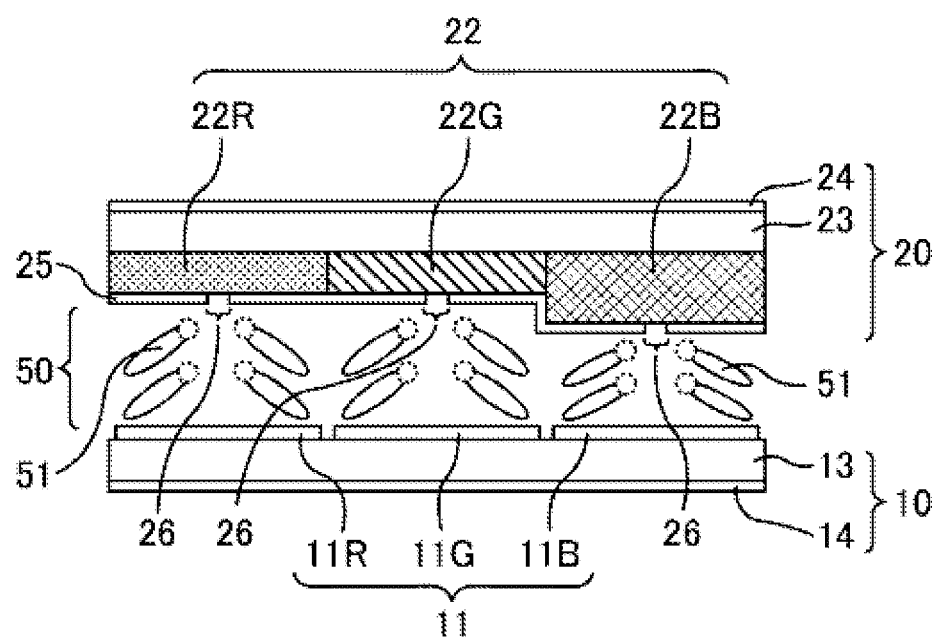
FIG. 6 is a schematic cross-sectional view showing the liquid crystal display panel of Embodiment 3, and shows a cross-section including three pixels that are red (R), green (G) and blue (B).

FIG. 5 is a schematic plan view showing the configuration of one of the pixel electrodes included in a liquid crystal display panel of Embodiment 3. FIG. 6 is a schematic cross-sectional view of the liquid crystal display panel of Embodiment 3, and shows the cross-section including three pixels that are red (R), green (G), and blue (B). The liquid crystal display panel of Embodiment 3 is similar to Embodiment 1 except for an aspect that slits, which are formed in the common electrode, instead of the ribs are used as means of the two domain orientation division.

As shown in FIGS. 5 and 6, a method of the orientation division is not limited to a method of using ribs in the liquid crystal display panel of Embodiment 1, and slits 26 formed in the common electrode 25 may be used as well. Accordingly, a region of the liquid crystal layer 50 corresponding to a single pixel electrode 11 is divided into two regions that are a first region 71 and a second region 72 by the slits 26 and by the outer periphery (edge) of the pixel electrodes 11. When the slits 26 are formed in the common electrode 25, each of the respective liquid crystal molecules 51 is oriented toward the slits 26 that are formed in the common electrode 25. As a result, when the pair of substrates 10 and 20 is viewed in the front direction, the respective liquid crystal molecules 51 are oriented so as to have their longitudinal axis in a vertical direction and in parallel with each other, as shown in FIG. 5. Meanwhile, as shown in FIG. 6, when the pair of substrates 10 and 20 is viewed in a cross-sectional direction, the respective liquid crystal molecules 51 are oriented in directions oblique to surfaces of the pair of substrates 10 and 20 and symmetrically to each other by the borderlines of the divided regions. Accordingly, because the two domain orientation division is applied to the liquid crystal display panel of Embodiment 3, it is possible to suppress a gamma characteristics change, which occurs when a viewing angle is changed from the front direction to oblique directions (left or right direction). Moreover, a viewing angle characteristic can be further improved by designing the liquid crystal layer thickness in the green wavelength to be smaller than the liquid crystal layer thickness in the red wavelength.

Embodiment 4

Figure 7:
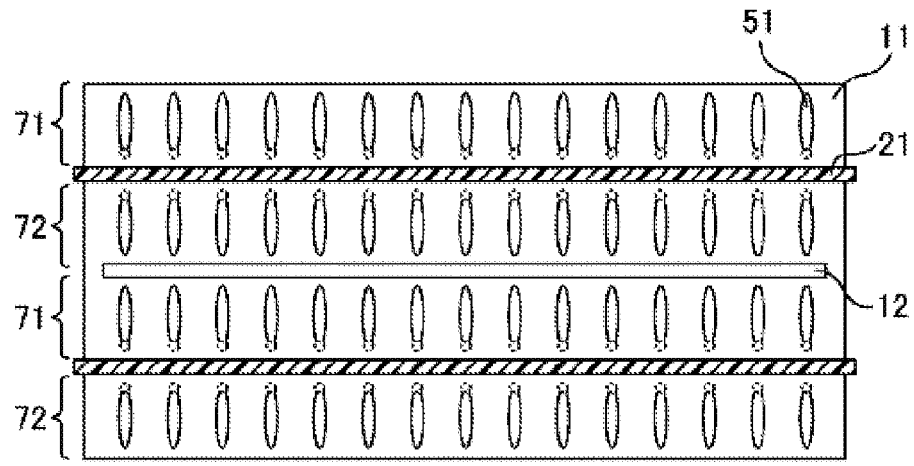
FIG. 7 is a schematic plan view showing the configuration of one of pixel electrodes included in a liquid crystal display panel of Embodiment 4.
Figure 8:
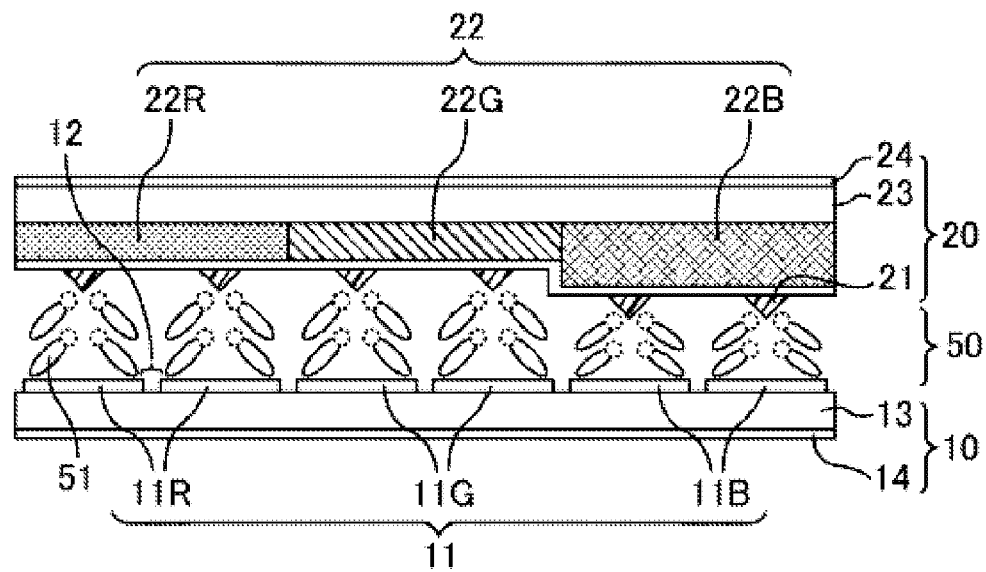
FIG. 8 is a schematic cross-sectional view of the liquid crystal display panel of Embodiment 4, and shows a cross-section including three pixels that are red (R), green (G) and blue (B).

FIG. 7 is a schematic plan view showing the configuration of one of pixel electrodes included in a liquid crystal display panel of Embodiment 4. FIG. 8 is a schematic cross-sectional view of the liquid crystal display panel of Embodiment 4, and shows the cross-section including three pixels that are red (R), green (G), and blue (B). The liquid crystal display panel of Embodiment 4 is similar to Embodiment 1 except for an aspect that the two domain orientation division in Embodiment 4 is not an orientation division using either the ribs or the slits, but an orientation division using both the ribs and the slits, the slits being formed in the pixel electrodes.

As shown in FIG. 7, in the liquid crystal display panel of Embodiment 4, the ribs 21 and the slits 12 are formed in parallel with each other as well as to cut across the pixel electrode 11 horizontally to equally divide the pixel electrode 11. As a result, a region of the liquid crystal layer 50 corresponding to a single pixel electrode 11 is divided into two regions that are a first region 71 and a second region 72 by the ribs 21, the slits 12 and by the outer periphery (edge) of the pixel electrodes 11. Further, the directions of inclination of the liquid crystal molecules 51 are same within the first region 71, and the directions of inclination of the respective liquid crystal molecules 51 are same within the second region 72.

Similarly to the above-described cases of using the ribs 21 or the slits 26, each of the respective liquid crystal molecules 51 is oriented toward the ribs 21 and the slits 12. As a result, when the pair of substrates 10 and 20 is viewed in the front direction, the respective liquid crystal molecules 51 are oriented to have their longitudinal axis in vertical directions as well as in parallel with each other, as shown in FIG. 7. Meanwhile, as shown in FIG. 8, when the pair of substrates 10 and 20 is viewed in a cross-sectional direction, the respective liquid crystal molecules 51 are oriented in directions oblique to surfaces of the pair of substrates 10 and 20 and symmetrically to each other by the borderlines of the divided regions. Accordingly, because the two domain orientation division is applied to the liquid crystal display panel of Embodiment 4, it is possible to suppress a gamma characteristics change, which occurs when a viewing angle is changed from the front direction to oblique directions (left or right direction). Further, a viewing angle characteristic can be further improved by designing the liquid crystal layer thickness in the green wavelength to be smaller than the liquid crystal layer thickness in the red wavelength.

The size of a pixel needs to be designed larger in the liquid crystal display panel of Embodiment 4 compared to Embodiment 1. This is effective when the ribs 21 or the slits 12 only cannot add a sufficient orientation to the liquid crystal molecules 51. This makes it possible to add a sufficient orientation to most of the liquid crystal molecules 51.

Moreover, according to the liquid crystal display panel of Embodiment 4, the orientation direction of the two domain orientation can be improved compared to Embodiment 1 when the pixel size is similar. As a result, it is possible to achieve higher effects of suppressing a gamma characteristics change and lowering a chromaticity change.

Embodiment 5

Figure 9:
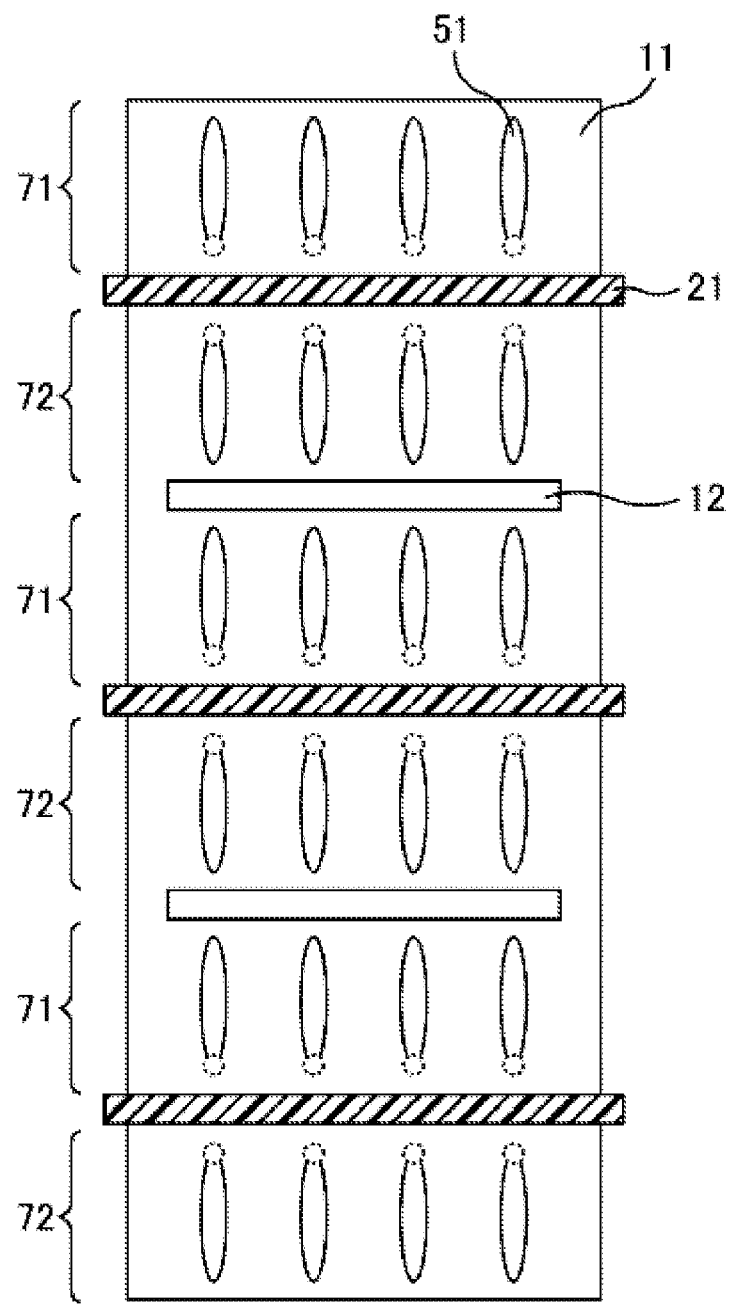
FIG. 9 is a schematic plan view showing the configuration of one of pixel electrodes included in a liquid crystal display panel of Embodiment 5.

FIG. 9 is a schematic plan view showing the configuration of one of the pixel electrodes included in a liquid crystal display panel of Embodiment 5. Embodiment 5 is different from Embodiment 1 in an aspect that the pixel electrode 11 has a rectangular shape with a long side in a vertical direction (up-down direction) and a short side in a horizontal direction (left-right direction), but everything else is similar to Embodiment 1. In the liquid crystal panel of Embodiment 5, the pixel electrode 11 is designed to be longer in a vertical direction than in a horizontal direction, and therefore, a larger number of the ribs 21 and a larger number of the slits 12 in the pixel electrodes are formed in order to add a sufficient orientation to the respective liquid crystal molecules 51. Because the liquid crystal molecules are divided into a first region 71 and a second region 72 having two orientations in this embodiment as well, the effects of the two domain orientation division can be achieved similarly to Embodiment 1.

Embodiment 6

Figure 10:
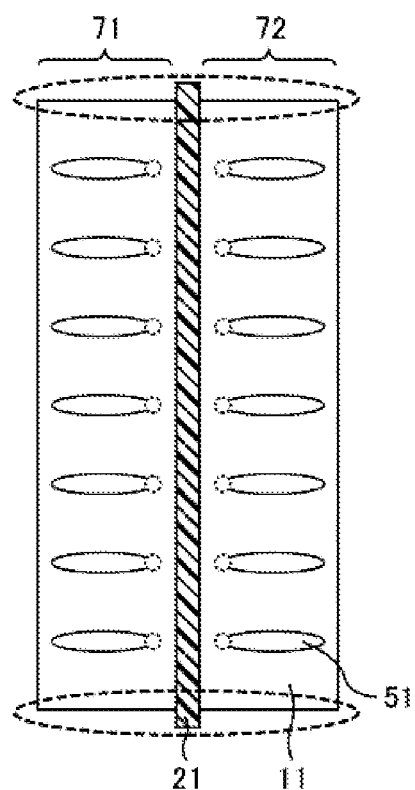
FIG. 10 is a schematic plan view showing the configuration of one of pixel electrodes included in a liquid crystal display panel of Embodiment 6.

FIG. 10 is a schematic plan view showing the configuration of one of the pixel electrodes included in a liquid crystal display panel of Embodiment 6. Embodiment 6 is different from Embodiment 1 in an aspect that the pixel electrode 11 has a rectangular shape with a short side in a horizontal direction (left-right direction) and a long side in a vertical direction (up-down direction), and when the respective pixel electrodes 11 are viewed in the front direction, the ribs 21 are disposed so as to cut across the pixel electrode 11 in the center in a vertical direction, but everything else is similar to Embodiment 1.

In the liquid crystal panel of Embodiment 6, the pixel electrode 11 is divided into two domains in a vertical direction, not in a horizontal direction, and therefore, when the pair of substrates 10 and 20 is viewed in the front direction, the respective liquid crystal molecules 51 are oriented to have their longitudinal axis in a horizontal direction as well as in parallel with each other as shown in FIG. 10. In Embodiment 6, the two domain orientation division is applied to the liquid crystal layer 50 by the rib 21 in this manner, and a display characteristic similar to the front direction can be achieved even when a viewer tilts his/her viewing angle in the directions divided by the rib 21, that is, a direction upward or downward as the pair substrate 10 and 20 is viewed in the front direction. Therefore, it is possible to greatly suppress a change in gamma characteristics and chromaticity between when viewed in the front direction and when viewed in oblique directions (upward or downward directions). Moreover, it is also possible to replace the rib 21 with the slit 26, or to form the slit 12 in the pixel electrode 11 to make each domain smaller similarly to the horizontally long pixel electrode.

Further, the orientation of respective liquid crystal molecules 51 are divided by the rib 21, which extends in an up-down direction (vertical direction), and by the edges of the pixel electrodes 11 in Embodiment 6. Therefore, among a plurality of the liquid crystal molecules 51 that are overlapping with the pixel electrodes 11, the orientation is likely to be disorderly in the liquid crystal molecules positioned in regions (dotted elliptic mark in FIG. 10) that are overlapping with the upper end and the lower end of the pixel electrodes 11, and loss of transmittance could occur in these regions. In response to this, the liquid crystal display panel of Embodiment 6 is designed such that the pixel electrode 11 is longer in a vertical direction than in a horizontal direction. Therefore, even when the liquid crystal molecules 51 are orientated horizontally, that is, when the orientation division is applied by disposing the rib 21 so as to cut across the pixel electrodes 11 in a vertical direction, it is possible to suppress loss of transmittance due to an orientation disorder caused at the ends of the pixel electrodes 11, compared to when the pixel electrode 11 is designed to be longer in a horizontal direction than in a vertical direction.

Further, when the pixel electrode 11 is designed to be longer in a vertical direction than in a horizontal direction, it is preferable from a display controlling point of view to position the red, green and blue pixel electrodes adjacent to each other in a horizontal direction. Moreover, in relation to this, it is preferable that gate signals transmitting through the gate signal wires 62 be adjusted so as to be driven at one third of the speed of when the red, green and blue pixel electrodes 11 are vertically aligned, and it is preferable that the number of the source signal wires 63 be increased to three times the number of the source signal wires 63 of when the red, green and blue pixel electrodes 11 are vertically aligned.

Embodiment 7

Figure 11:
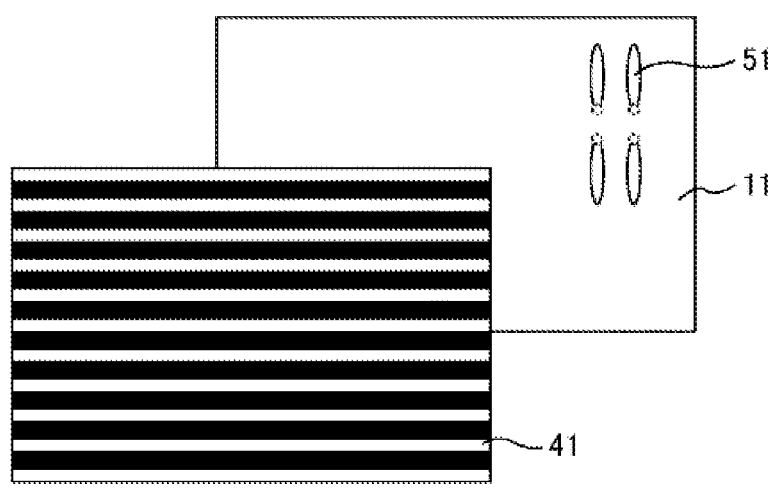
FIG. 11 is a schematic exploded plan view of a liquid crystal display panel of Embodiment 7, showing when each of the liquid crystal molecules is orientated vertically.
Figure 12:
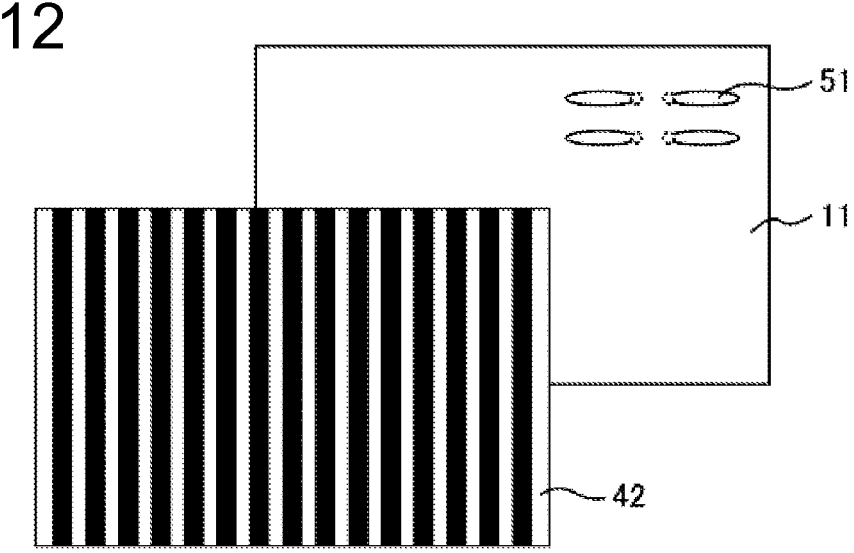
FIG. 12 is a schematic exploded plan view of the liquid crystal display panel of Embodiment 7, showing when each of the liquid crystal molecules is oriented horizontally.

FIGS. 11 and 12 are schematic exploded plan views of a liquid crystal display panel of Embodiment 7. FIG. 11 shows when the liquid crystal molecules are respectively oriented in vertical directions, and FIG. 12 shows when the liquid crystal molecules are respectively oriented in horizontal directions. The liquid crystal display panel of Embodiment 7 is the liquid crystal display panel of Embodiments 1 to 6 that further includes a diffusion sheet for blocking light incident from a direction oblique to surfaces of the pair of substrates 10 and 20, and for horizontally or vertically guiding light incident from a direction perpendicular to the surfaces of the pair of substrates 10 and 20, which is an aspect different from Embodiments 1 to 6, but everything else is similar to Embodiments 1 to 6.

Figure 13:
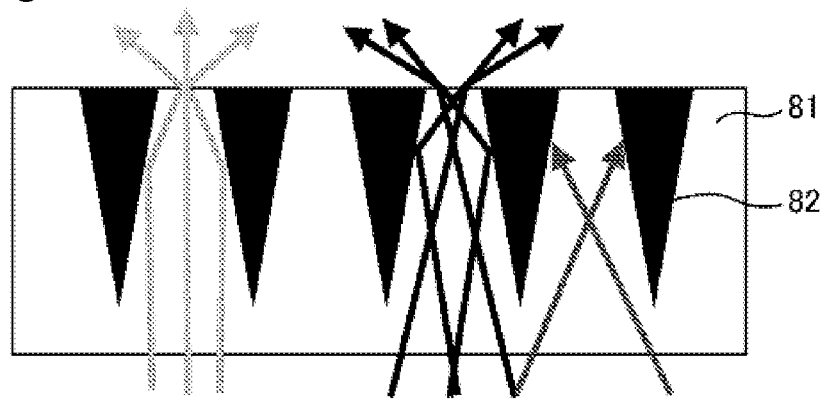
FIG. 13 is a schematic cross-sectional view of a TIR included in the liquid crystal display panel of Embodiment 7.

A total internal reflection diffusion sheet (hereinafter also referred to as a TIR (Total Internal Reflection)), a lenticular lens sheet or the like can be used as the diffusion sheet. FIG. 13 is a schematic cross-sectional view of a TIR included in the liquid crystal display panel of Embodiment 7. The TIR has a structure in which a black low refractive index resin 82 having a wedge-shaped cross section is embedded in stripes in a transparent high refractive index resin 81, and has a flat front and back surfaces. As shown in FIG. 13, the TIR has a structure in which light incident from the front direction is fully reflected in an interfacial surface of the transparent high refractive index resin 81 and the black low refractive index resin 82, and then the light is diffused and emitted from the surface, and light incident from oblique directions is absorbed in the black low refractive index part (becomes non total reflection condition), and therefore, it is possible to significantly improve a viewing angle characteristic in a direction light is guided. Here, FIG. 13 schematically shows three different patterns of the light absorption and diffusion.

Figure 14:
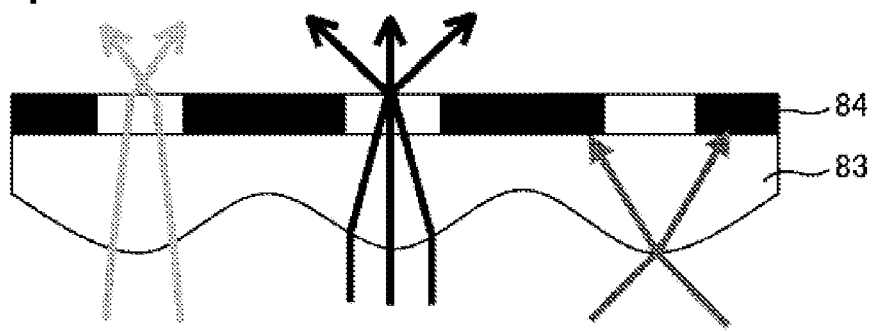
FIG. 14 is a schematic cross-sectional view of a lenticular lens sheet included in the liquid crystal display panel of Embodiment 7.

FIG. 14 is a schematic cross-sectional view of a lenticular lens sheet included in the liquid crystal display panel of Embodiment 7. An absorber part 84 is disposed in strips in areas except for the areas close to the focal points of the lens part 83. This absorber part 84 can be formed by a self-align exposure. This lenticular lens sheet has a structure in which light incident from the front direction is diffused and light incident from oblique directions is absorbed by the absorber part 84, and therefore, a viewing angle characteristic can be significantly improved in a direction light is guided. Here, FIG. 14 schematically shows three different patterns of the light absorption and diffusion.

As shown in FIG. 11, when each of the liquid crystal molecules 51 is vertically oriented, a diffusion sheet (hereinafter also referred to as a vertical diffusion sheet.) 41 having a characteristic of vertically guiding light incident from a direction perpendicular to the substrate surface is used as the diffusion sheet. Meanwhile, as shown in FIG. 12, when each of the liquid crystal molecules 51 is horizontally oriented, a diffusion sheet (hereinafter also referred to as a horizontal diffusion sheet.) 42 having a characteristic of horizontally guiding light incident from a direction perpendicular to the substrate surface is used as the diffusion sheet.

When each of the liquid crystal molecules 51 is vertically oriented, for example, the two domain orientation division significantly improves the viewing angle characteristic in horizontal directions, but a problem remains in a display characteristic of the viewing angle characteristic in vertical directions. Moreover, when each of the liquid crystal molecules 51 is horizontally oriented, a viewing angle characteristic in vertical directions is significantly improved, but a problem remains in a display characteristic of the viewing angle characteristic in horizontal directions.

According to the configuration of Embodiment 7 in FIG. 11, when the liquid crystal molecules 51 are vertically oriented, the vertical diffusion sheet 41 for diffusing light in vertical directions is used, and therefore, a viewing angle in horizontal directions is improved by the two domain orientations, and a viewing angle in vertical directions is improved by the vertical diffusion sheet 41. As a result, gamma characteristics and lowering of chromaticity are reduced in all directions of vertical directions and horizontal directions, and a high quality display can be viewed in all directions.

According to the configuration of Embodiment 7 in FIG. 12, when the liquid crystal molecules 51 are horizontally oriented, the horizontal diffusion sheet 42 for diffusing light in horizontal directions is used, and therefore, a viewing angle in vertical directions is improved by the two domain orientation, and a viewing angle in horizontal directions is improved by the horizontal diffusion sheet 42. As a result, gamma characteristics and lowering of chromaticity are reduced in all directions of vertical directions and horizontal directions, and a high quality display can be viewed in all directions.

Figure 15:
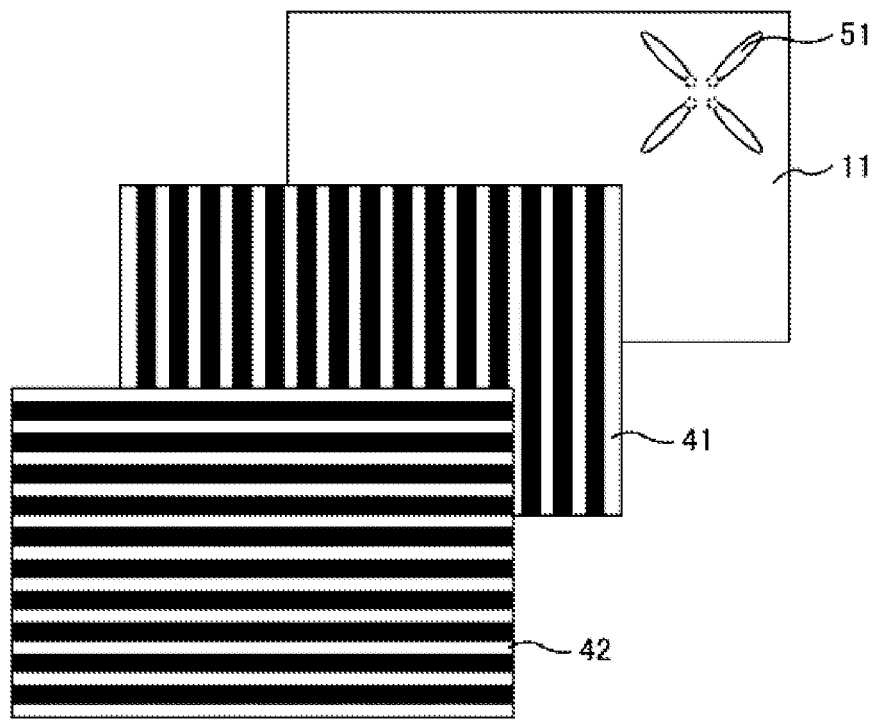
FIG. 15 is a schematic exploded plan view of a liquid crystal display panel of a comparative example 1.

Further, in view of improvement effects by the above-mentioned diffusion sheets, it is possible to consider using both the vertical diffusion sheet 41 and the horizontal diffusion sheet 42 to guide light that is necessary to the vertical and horizontal directions, respectively, in addition to the four domain orientation division (comparative example 1). FIG. 15 is a schematic exploded plan view of a liquid crystal display panel of the comparative example 1. According to the liquid crystal display panel of the comparative example 1, however, the brightness of the front surface is lowered due to a lowering of the total aperture ratio caused by the diffusion sheets, the front surface contrast is lowered due to an increase of relative luminance when displaying black, a blurred image is caused due to an increase in the total thickness of the diffusion sheets, and occurring of moire is recognized due to an increase in a cycle pattern. Moreover, the cost is also increased because two diffusion sheets are used.

Evaluation Test 1

In order to verify a gamma characteristics (gradation-luminance characteristics) change of the liquid crystal display panel of the present invention, an evaluation was performed on the liquid crystal display panels of reference examples 1 to 3, Example 1, and comparison example 1.

The liquid crystal display panel of Example 1 is an example of the liquid crystal display panel according to Embodiment 1 of the present invention, and has a multi-gap structure in which the two domain orientation division is applied, and the liquid crystal layer thickness is substantially same in the regions corresponding to the red and green pixel electrodes, and the liquid crystal layer thickness is smaller in the region corresponding to the blue pixel electrode than in the regions corresponding to the red and green pixel electrodes. More specifically, a ratio of the liquid crystal layer thickness in the regions corresponding to the blue pixel electrode (d (B)) to either the liquid crystal layer thickness in the region corresponding to the red pixel electrode (d (R)) or the liquid crystal layer thickness in the region corresponding to the green pixel electrode (d (G)) (d (B) divided by d (G) or d (R)) was set to 0.82.

The liquid crystal display panel of the reference example 1 is an example of a liquid crystal display panel that is compared to the present invention, and is an example in which the four domain orientation division is applied instead of the two domain orientation division, and the liquid crystal layer thickness is substantially same in the region corresponding to the red pixel electrode, the region corresponding to the green pixel electrode, and the region corresponding to the blue pixel electrode (no multi-gap structure is formed).

The liquid crystal display panel of the reference example 2 is an example of a liquid crystal display panel that is compared to the present invention, and is an example including a multi-gap structure in which the four domain orientation division is applied instead of the two domain orientation division, and the liquid crystal layer thickness is substantially same in the regions corresponding to the red pixel electrode and the green pixel electrode, and the thickness of the liquid crystal layer is smaller in the region corresponding to the blue pixel electrode than in the region corresponding to the red pixel electrode and in the region corresponding to the green pixel electrode. More specifically, a ratio of the liquid crystal layer thickness in the region corresponding to the blue pixel electrode (d (B)) to either the liquid crystal layer thickness in the region corresponding to the red pixel electrode (d (R)) or the liquid crystal layer thickness in the region corresponding to the green pixel electrode (d (G)) (d (B) divided by d (G) or d (R)) was set to 0.82.

The liquid crystal display panel of the reference example 3 is an example of a liquid crystal display panel that is compared to the present invention, and is an example in which the two domain orientation division is applied, and the liquid crystal layer thickness is substantially same in the region corresponding to the red pixel electrode, the region corresponding to the green pixel electrode, and in the region corresponding to the blue pixel electrode (no multi-gap structure is formed).

The liquid crystal display panel of the comparison example 1 is an example of a conventional liquid crystal display panel, and is an example in which a mono-domain liquid crystal display panel, which has not undergone an orientation division, is applied with a multi-gap structure such that the liquid crystal layer thickness is substantially same in the regions corresponding to the red pixel electrode and the green pixel electrode, and the liquid crystal layer thickness is smaller in the region corresponding to the blue pixel electrode than in the region corresponding to the red pixel electrode and in the region corresponding to the green pixel electrode.

Figure 16:
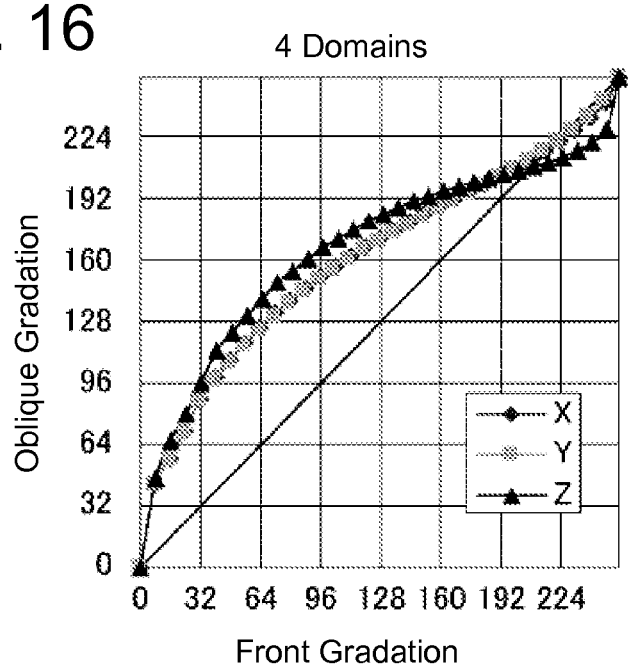
FIG. 16 is a graph showing relative relationships among the respective gradation values of X, Y and Z of a reference example 1 when viewed in the front direction and when viewed in an oblique direction (direction tilted 45° to the left or right from the front direction).
Figure 17:
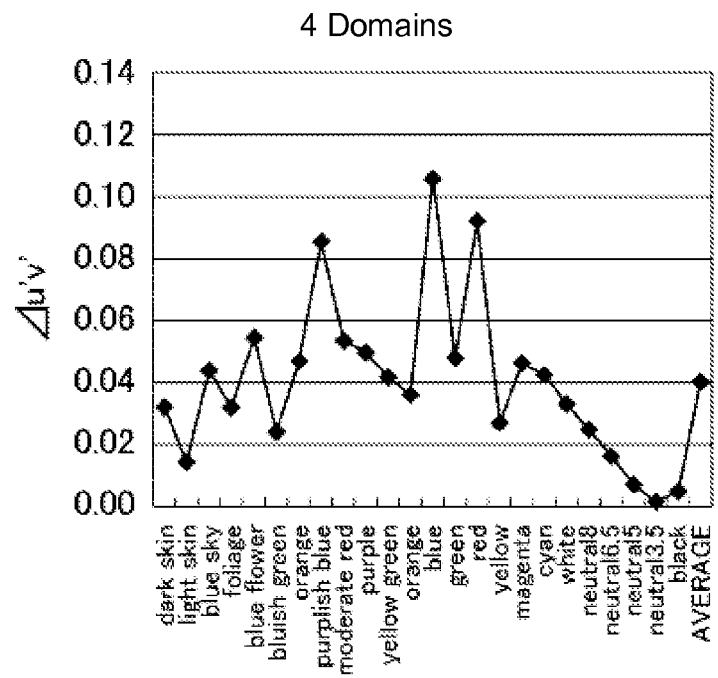
FIG. 17 is a graph showing values of the amount of each color's chromaticity change based on a Macbeth chart in the reference example 1, and their average value.
Figure 18:
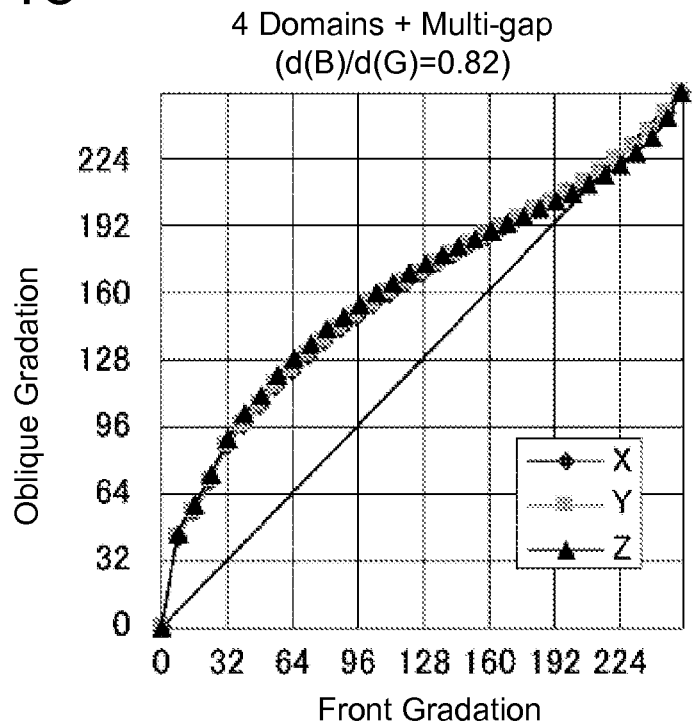
FIG. 18 is a graph showing relative relationships among the respective gradation values of X, Y and Z of a reference example 2 when viewed in the front direction and when viewed in an oblique direction (tilted 45° to the left or right from the front direction).
Figure 19:
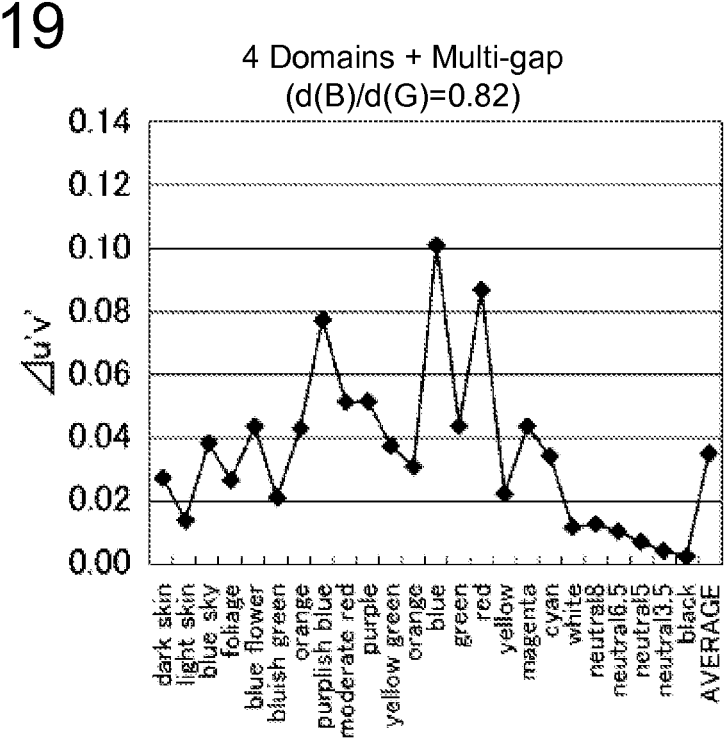
FIG. 19 is a graph showing values of the amount of each color's chromaticity change based on a Macbeth chart in the reference example 2, and their average values.
Figure 20:
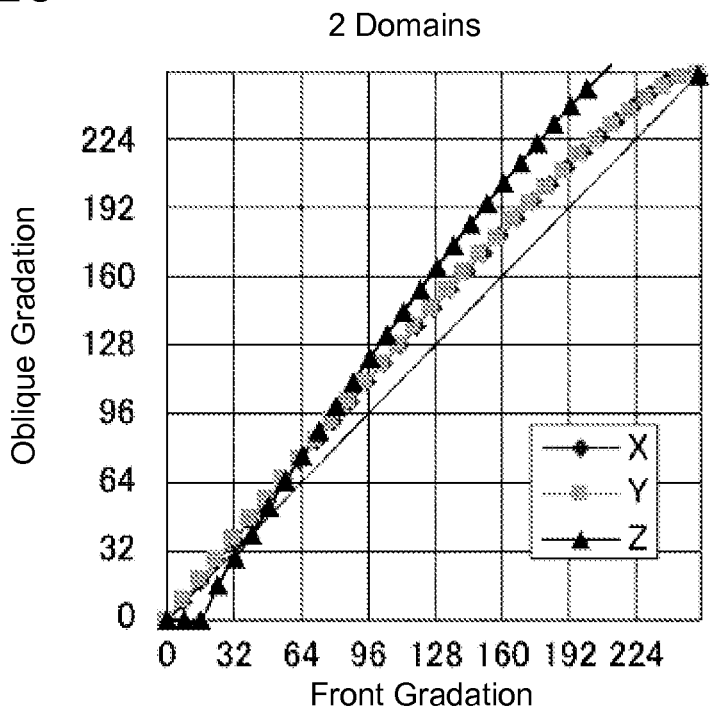
FIG. 20 is a graph showing relative relationships among the respective gradation values of X, Y and Z of a reference example 3 when viewed in the front direction and when viewed in an oblique direction (tilted 45° to the left or right from the front direction).
Figure 21:
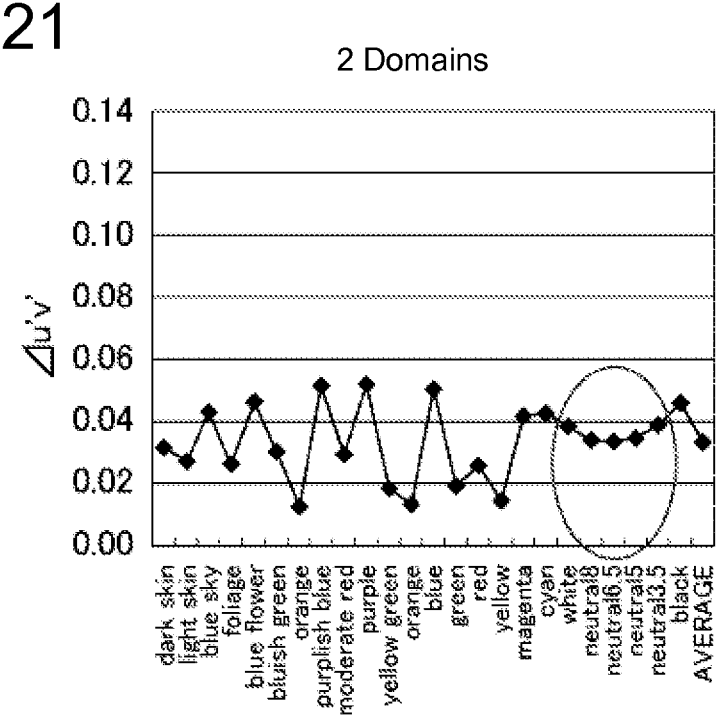
FIG. 21 is a graph showing values of the amount of each color's chromaticity change based on a Macbeth chart in the reference example 3, and their average values.
Figure 22:
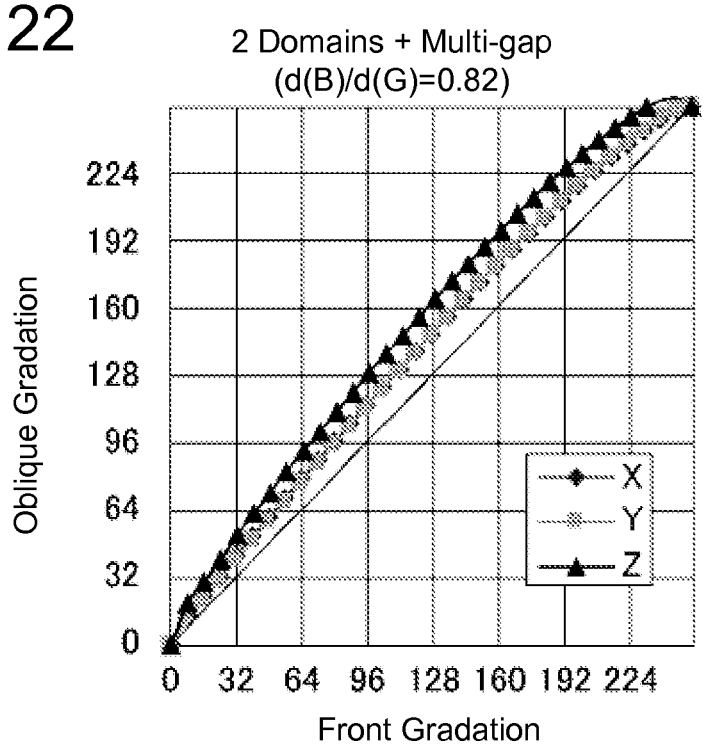
FIG. 22 is a graph showing relative relationships among the respective gradation values of X, Y and Z of Example 1 when viewed in the front direction and when viewed in an oblique direction (tilted 45° to the left or right from the front direction).
Figure 23:
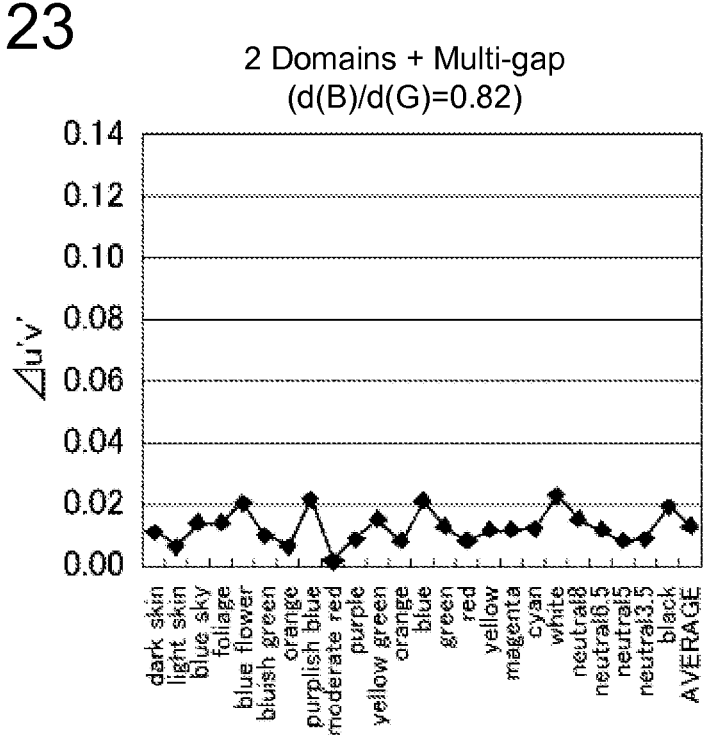
FIG. 23 is a graph showing values of the amount of each color's chromaticity change based on a Macbeth chart in Example 1, and their average values.

In order to verify the suppression effect of a gamma characteristics change for the liquid crystal display panel of Embodiment 1, gradation values of the respective X (red), Y (green) and Z (blue) based on a tristimulus value were calculated using the liquid crystal display panels of the reference examples 1 to 3 and Example 1. A liquid crystal orientation simulator "LCD Master" of Symtec was used for calculating the gradation values. FIGS. 16 and 17 show the calculation result of the reference example 1, FIGS. 18 and 19 show the calculation result of the reference example 2, FIGS. 20 and 21 show the calculation result of the reference example 3, and FIGS. 22 and 23 show the calculation result of Example 1, respectively. FIGS. 16, 18, 20 and 22 are graphs showing relative relationships among the respective gradation values of X, Y and Z when viewed in the front direction and when viewed in oblique directions (tilted 45° to the left or right from the front direction).

Further, in order to verify the suppression effect of a chromaticity characteristic change in the liquid crystal display panel of Embodiment 1, the amount of change was measured in u'v' values (Δu'v') based on CIE1976 Lu'v' color matching function when the liquid crystal display panels of the reference examples 1 to 3 and Example 1 are tilted from the front direction to oblique directions (tilted 45° to the left or right from the front direction), and the value was used as an evaluation index of the chromaticity change. The liquid crystal orientation simulator "LCD Master" of Symtec was used for calculating the u'v' values. FIGS. 17, 19, 21 and 23 are graphs showing values of the amount of each color's chromaticity change based on a Macbeth chart, and their average values.

As shown in FIGS. 16 and 18, a large shift in gradation values was seen for the respective gradation of X, Y and Z between the front gradation and the oblique gradation (horizontal direction) in the examples in which the four domain orientation division was applied (the reference examples 1 and 2). Specifically, comparing the front gradation and the oblique gradation (horizontal direction), higher values were obtained for the oblique gradation. Further, when FIG. 16 and FIG. 18 are compared, between the reference example 1 in which a multi-gap structure is formed and the reference example 2 in which a multi-gap is absent, differences among the values of the respective gradation of X, Y and Z was slightly improved in the reference example 2, however, the fundamental shifts in gradation values were not improved. Therefore, as shown in FIGS. 17 and 19, a substantial change in the Δu'v' values was commonly seen for most of the colors in the Macbeth charts.

Meanwhile, as seen in FIGS. 20 and 22, significant improvements in shifts of gradation values were seen for all of the gradation of X, Y and Z between the front gradation and the oblique gradation (horizontal direction) in the examples in which the two domain orientation division was applied (the reference example 3 and Example 1) compared to when the four domain orientation division was applied. Further, as seen by comparing FIG. 20 and FIG. 22, between the reference example 3 in which a multi-gap is absent and Example 1 in which a multi-gap is applied, a gap among the respective gradation values of X, Y and Z was further resolved in Example 1 in which a multi-gap was applied. Because shifts in gradation values as well as differences among the respective gradation values of X, Y and Z are small, as seen in FIG. 23, significant improvements were seen in a chromaticity change for most of the colors in the Macbeth chart in Example 1, and as a result of comparing FIG. 23 with FIG. 21, a chromatically change was significantly lowered especially for the Δu'v' values of achromatic colors such as white, neutral colors, black and the like, which are circled in FIG. 21. Moreover, as seen in FIG. 23, Example 1 has the Δu'v' values that are equal to or lower than 0.02 for almost all the colors, and achieved a degree that a chromaticity change is hardly recognized between when viewed in the front direction and when viewed in oblique directions (45° to the left or right).

Figure 24:
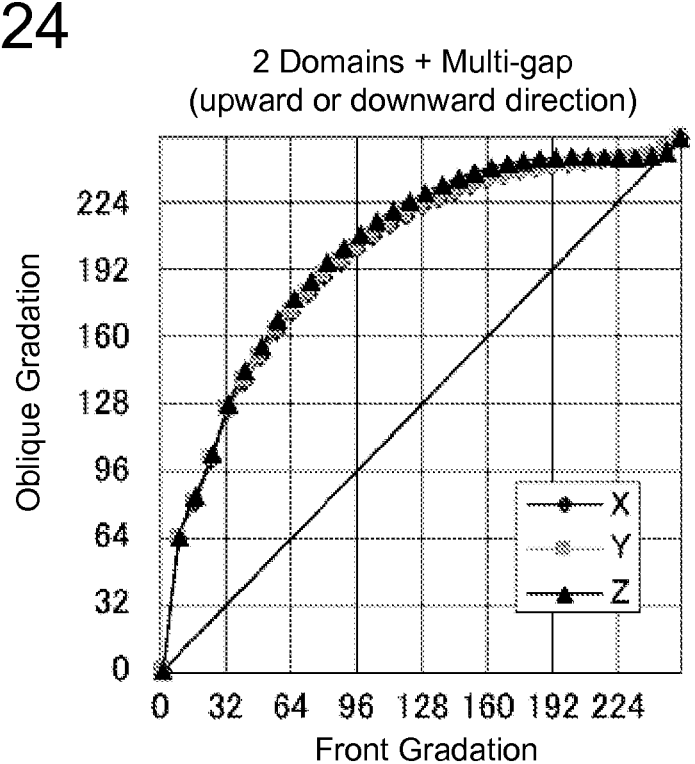
FIG. 24 is a graph showing relative relationships among the respective gradation values of X, Y and Z of Example 1 when viewed in the front direction and when viewed in an oblique direction (tilted 45° upward or downward from the front direction).
Figure 25:
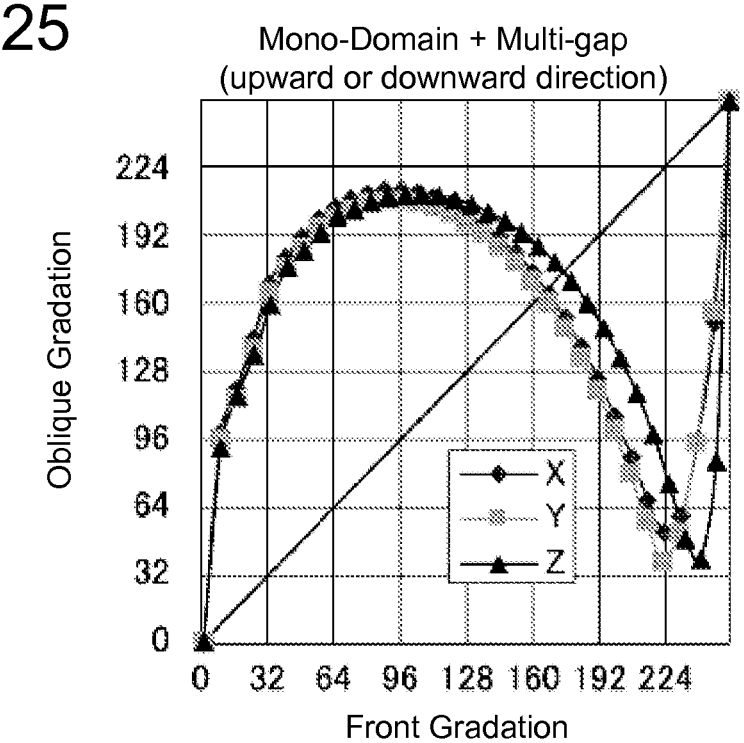
FIG. 25 is a graph showing relative relationships among the respective gradation values of X, Y and Z of a comparison example 1 when viewed in the front direction and when viewed in an oblique direction (tilted 45° upward or downward from the front direction).

Furthermore, in order to compare and verify a viewing angle characteristic of the liquid crystal display panel of Embodiment 1 and a viewing angle characteristic of a conventional liquid crystal display panel when tilted from the front direction to oblique directions (directions tilted 45° upward or downward from the front direction), gradation values of the respective X (red), Y (green) and Z (blue) based on tristimulus values were calculated using the liquid crystal display panels of Example 1 and the comparison example 1. The liquid crystal orientation simulator "LCD Master" of Symtec was used for calculating the gradation values. FIG. 24 is a graph showing relative relationships among the respective gradation values of X, Y and Z of the liquid crystal display panel of Example 1 when viewed in the front direction and when viewed in oblique directions (tilted 45° upward or downward from the front direction). FIG. 25 is a graph showing relative relationships among the respective gradation values of X, Y and Z of the liquid crystal display panel of the comparison example 1 when viewed in the front direction and when viewed in oblique directions (tilted 45° upward or downward from the front direction).

As seen in FIG. 24, in the liquid crystal display panel of Example 1, substantial shifts in gradation values were seen for all of the gradation of X, Y and Z between when viewed in the front direction and when viewed in oblique directions (direction tilted 45° upward or downward from the front direction), but no big difference was seen among the respective gradations, and gray scale inversion was not seen as well.

On the other hand, as seen in FIG. 25, in the liquid crystal display panel of a comparison example 1 in which no orientation division was applied, not only substantial shifts in gradation values were seen for all of the gradations of X, Y and Z between the front gradation and the oblique gradation (upward or downward direction), but also deviations were seen among the respective gradations, and gray scale inversion occurred for all of the gradation of X, Y and Z as well. As a result, a display with an undesirable appearance was obtained. Therefore, it was found that it is not possible to achieve a good result in terms of improving the entire viewing angle even when the liquid crystal layer thickness is adjusted to correspond to one direction in a mono-domain liquid crystal display panel.

Evaluation Test 2

In order to verify a gamma characteristics (gradation-luminance characteristic) change in the liquid crystal display panel of the present invention, prototype liquid crystal display panels of the reference example 4 and Example 2 were manufactured and evaluated. Here, the liquid crystal display panel of Example 2 is an example of the liquid crystal display panel of Embodiment 1.

The liquid crystal display panel of the reference example 4 was manufactured as an example of a liquid crystal display panel that is compared to the present invention, and has a similar configuration to Example 2 except for the aspects that the four domain orientation division was applied, and the liquid crystal layer thickness was substantially the same in the region corresponding to the red pixel electrode, the region corresponding to the green pixel electrode, and in the region corresponding to the blue pixel electrode.

The liquid crystal display panel of Example 2 was manufactured as an example of the liquid crystal display panel of the present invention, and the two domain orientation division was applied as well as a multi-gap structure was formed such that the liquid crystal layer was substantially same in the regions corresponding to the red and green pixel electrodes, and the liquid crystal layer was smaller in the region corresponding to the blue pixel electrode than in the region corresponding to the red pixel electrode and in the region corresponding to the green pixel electrode. More specifically, a ratio of the liquid crystal layer thickness in the region corresponding to the blue pixel electrode (d(B)) to either the thickness of the liquid crystal layer in the region corresponding to the red pixel electrode (d(R)) or the thickness of the liquid crystal layer in the region corresponding to the green pixel electrode (d(G)) (d(B) divided by d(G) or d(R)) was set to 0.84.

Figure 26:
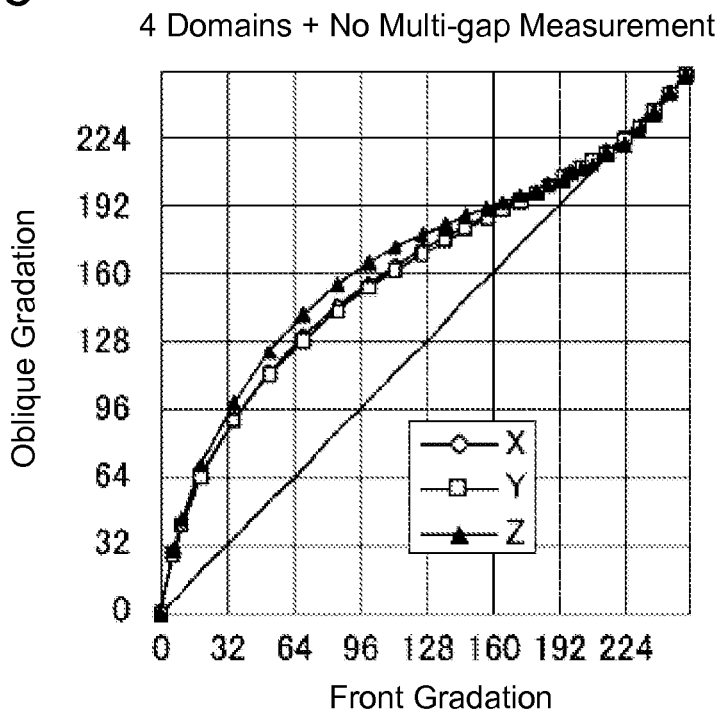
FIG. 26 is a graph showing relative relationships among the respective gradation values of X, Y and Z of a reference example 4 when viewed in the front direction and when viewed in an oblique direction (tilted 45° to the left or right from the front direction).
Figure 27:
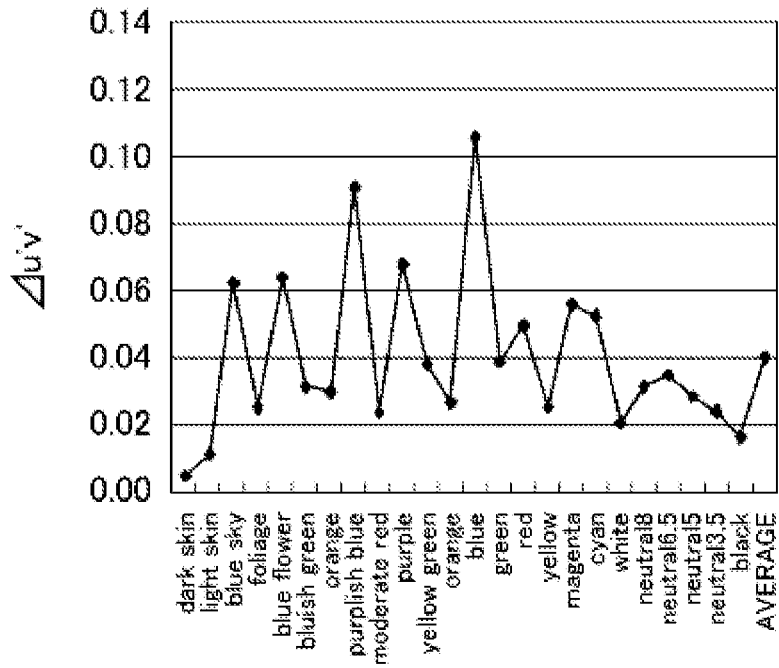
FIG. 27 is a graph showing values of the amount of each color's chromaticity changes based on a Macbeth chart in the reference example 4, and their average values.
Figure 28:
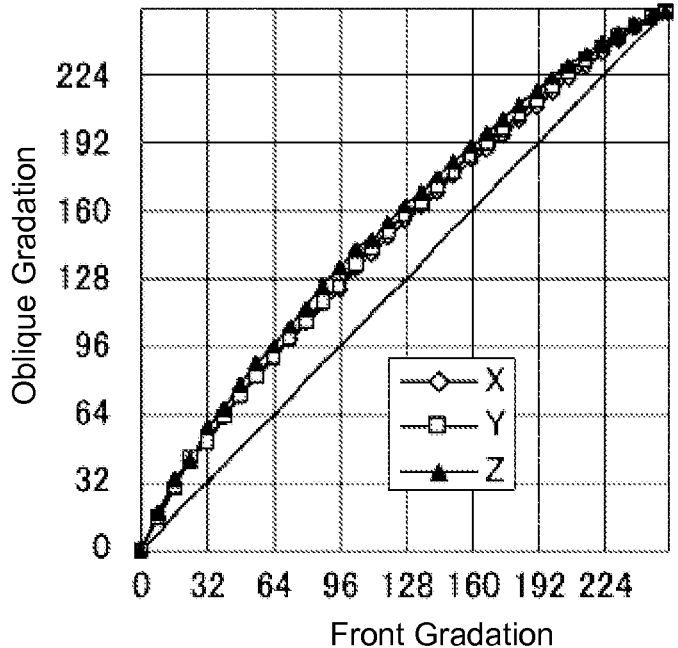
FIG. 28 is a graph showing relative relationships among the respective gradation values of X, Y and Z of Example 2 when viewed in the front direction and when viewed in an oblique direction (tilted 45° to the left or right from the front direction).
Figure 29:
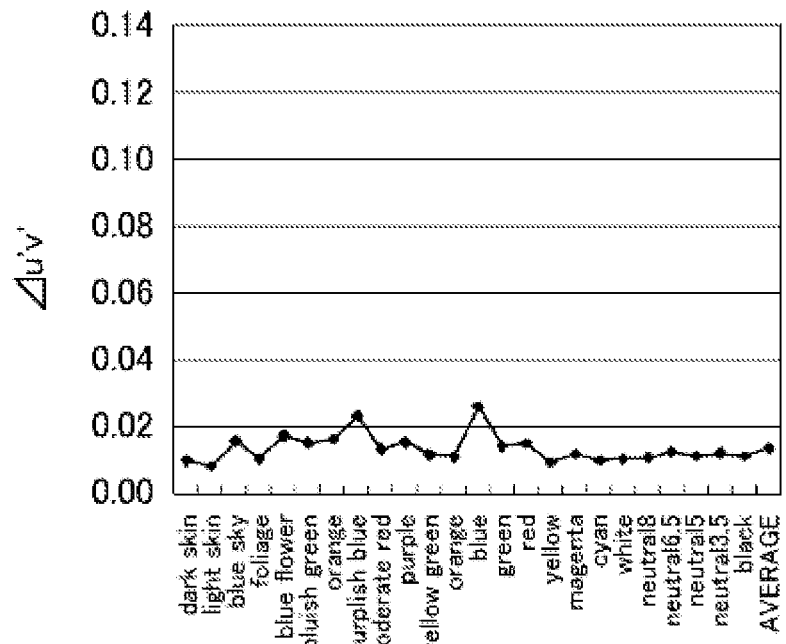
FIG. 29 is a graph showing values of the amount of each color's chromaticity change based on a Macbeth chart in Example 2, and their average values.

In order to verify the suppression effect of a gamma characteristics change in the liquid crystal display panel of Embodiment 1, the liquid crystal display panels of the reference example 4 and Example 2 were manufactured, and gradation values of the respective X (red), Y (green) and Z (blue) based on tristimulus values were measured. An ultra-low luminance spectral radiometer "SR-UL1" of TOPCON was used to measure the gradations. FIGS. 26 and 27 show results of the measurement of the reference example 4, and FIGS. 28 and 29 show results of the measurement of Example 2, respectively. FIGS. 26 and 28 are graphs showing relative relationships among the respective gradation values of X, Y and Z when viewed in the front direction and when viewed in oblique directions (tilted 45° to the left or right from the front direction).

Further, in order to verify the suppression effect of a chromaticity characteristic change in the liquid crystal display panel of Embodiment 1, the amount of change was measured in u'v' values (Δu'v') based on CIE1976 Lu'v' color matching function when the liquid crystal display panels of the reference example 4 and Example 2 were tilted from the front direction to oblique directions (tilted 45° to the left or right from the front direction), and the value was used as an evaluation index of the chromaticity change. A viewing angle measuring device "EZContrast160D" of ELDIM was used to measure the u'v' values. FIGS. 27 and 29 are graphs showing values of the amount of each color's chromaticity change based on a Macbeth chart, and their average values.

As seen in FIG. 26, large shifts in gradation values were seen for the gradation of all of X, Y and Z between the front gradation and the oblique gradation (left or right direction) in the examples in which the four domain orientation division was applied (the reference example 4). Specifically, between the front gradation and oblique gradation (left or right direction), higher values were obtained for the oblique gradations. This result also well matches the calculation result of the reference example 1. Additionally, as seen in FIG. 27, a significant change in the Δu'v' values was seen for most of the colors in the Macbeth chart. This result also well matches the calculation result of the reference example 1.

Meanwhile, as seen in FIG. 28, in an example (Example 2) in which the two domain orientation division was applied as well as a multi-gap structure was formed, between the front gradation and oblique gradation (left or right direction), significant improvements were seen in the shifts in gradation values between the front gradation and the oblique gradation (left or right direction) for all of the gradations of X, Y and Z. Moreover, it was found that the differences among the respective gradation values of X, Y and Z were resolved by forming a multi-gap structure. This result also well matches the calculation result of Example 1. Because the shifts in gradation values as well as a gap among the respective gradation values of X, Y and Z are small, as seen in FIG. 29, significant improvements in a chromaticity change were seen for most of the colors in the Macbeth chart of Example 2. This result also well matches the calculation result of Example 1. Moreover, as seen in FIG. 29, Example 2 has the Δu'v' values that are equal to or lower than 0.02 for almost all the colors, and achieved a degree that a chromaticity change is hardly recognized between when viewed in the front direction and when viewed in oblique directions (45° to the left or right).

Evaluation Test 3

Figure 30:
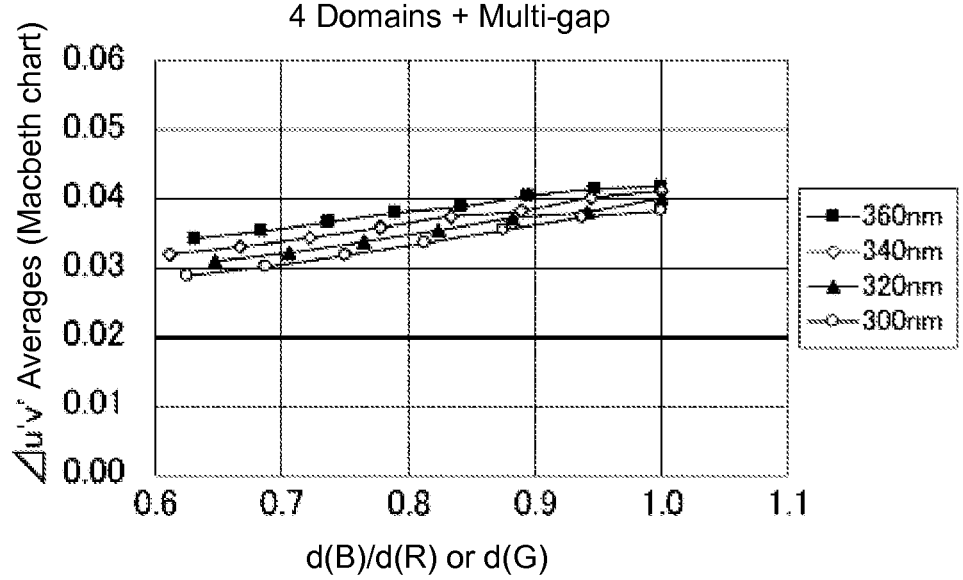
FIG. 30 is a graph showing relative relationships between a ratio of a liquid crystal layer thickness among the respective colors and average values of each color's Δu'v' based on a Macbeth chart according to the reference example 2.
Figure 31:
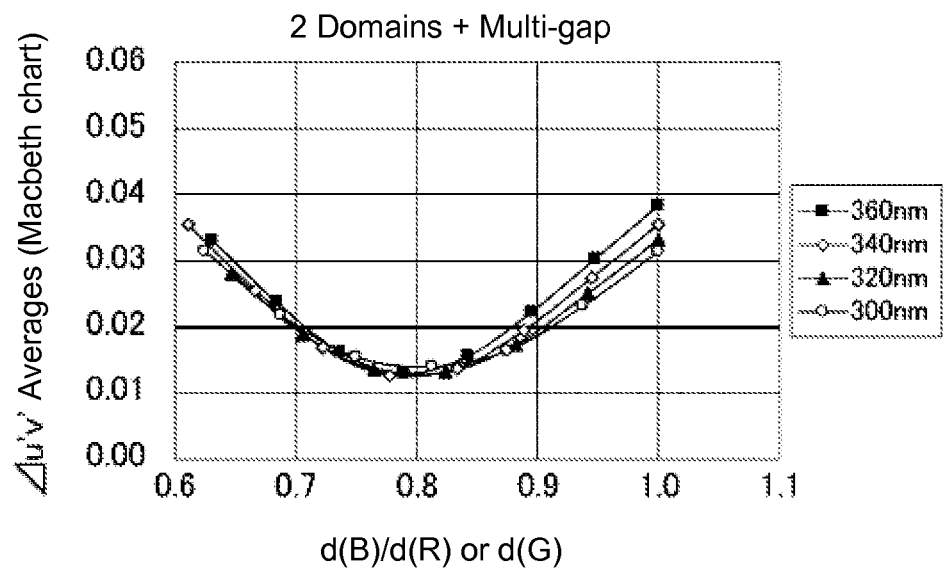
FIG. 31 is a graph showing relative relationships between a ratio of a liquid crystal layer thickness among the respective colors and average values of each color's Δu'v' based on a Macbeth chart according to Example 1.

In order to verify a preferable ratio of the liquid crystal layer thickness among the respective colors in the liquid crystal display panel of the present invention, an evaluation test was performed on the liquid crystal display panels of the reference example 2 and Example 1. FIGS. 30 and 31 are graphs showing relative relationships between the ratio of the liquid crystal layer thickness among the respective colors (the ratio of the liquid crystal layer thickness in the region corresponding to the blue pixel electrode d(B) to either the thickness of the liquid crystal layer in the region corresponding to the red pixel electrode d(R) or the thickness of the liquid crystal layer in the region corresponding to the green pixel electrode d(G) (d(B) divided by d(G) or d(R)) and the average values of each color's Δu'v' based on a Macbeth chart.

As seen in FIG. 30, when using the liquid crystal display panel of the reference example 2 in which the four domain orientation division was applied as well as a multi-gap structure was formed, it was found that the average values of Δu'v' in the Macbeth chart became equal to or higher than 0.03 even when a value of d(B) divided by d(G) or d(R) was set to any value, and therefore, reduction effects of a chromaticity change was small. Moreover, as seen in FIG. 30, the similar result was obtained even when the dΔn (G) value was set to any one of 300 nm, 320 nm, 340 nm and 360 nm.

Further, as seen in FIG. 30, when using the liquid crystal display panel of the reference example 2 in which the four domain orientation division is applied, it was not possible to suppress a chromaticity change even when a multi-gap structure was formed to change the thickness of the liquid crystal layer among the regions corresponding to the respective colors.

On the other hand, as seen in FIG. 31, when using the liquid crystal display panel of Example 1 in which the two domain orientation division is applied as well as a multi-gap structure is formed, if the value of d(B) divided by d(G) or d(R) is in a range of 0.7 to 0.9, average values of Δu'v' in a Macbeth chart became equal to or lower than 0.02. Therefore, it was found that by adjusting the thickness of the liquid crystal layer in the region corresponding to the blue pixel electrode to be in a range of 0.7 to 0.9 times the thickness of the liquid crystal layer in the regions corresponding to the green or red pixel electrodes, it is possible to suppress in an especially preferable manner a chromaticity change that occurs when a viewing angle is tilted from the front direction to oblique directions (tilted 45° to the left or right from the front direction). Moreover, as seen in FIG. 31, the similar result was obtained even when the value of the dΔn (G) was set to any one of 300 nm, 320 nm, 340 nm and 360 nm.

Therefore, it was found that it is not sufficient to only adjust the thickness of the liquid crystal layer in the regions corresponding to the respective colors, or only apply the two domain orientation division, but it is necessary to adjust the thickness of the liquid crystal layer in the regions corresponding to the respective colors after the two domain orientation division is applied in order to achieve sufficient effects of suppressing a chromaticity change.

Evaluation 4

On the condition that the liquid crystal layer has a smaller thickness in the region corresponding to the blue pixel electrode than in the region corresponding to the green pixel electrode and in the region corresponding to the red pixel electrode, an evaluation test was performed to further verify what value is suited for the ratio of the liquid crystal layer thickness in the region corresponding to the green pixel electrode to the liquid crystal layer thickness in the region corresponding to the red pixel electrode.

Figure 32:
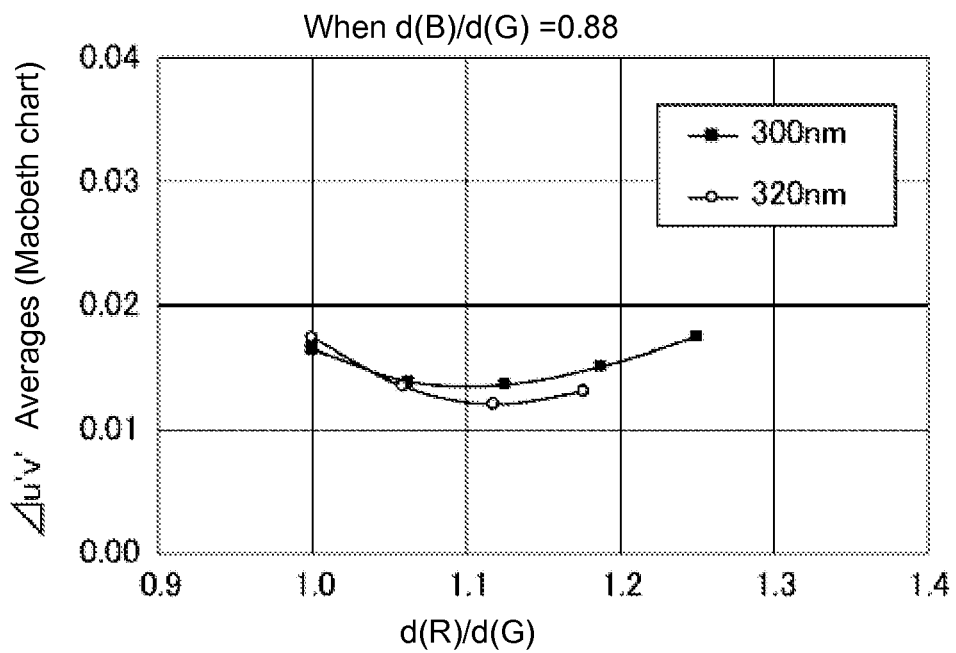
FIG. 32 is a graph showing relative relationships between a ratio of the liquid crystal layer thickness in a region corresponding to the red pixel electrode to the liquid crystal layer thickness in a region corresponding to the green pixel electrode when the liquid crystal layer thickness in a region corresponding to the blue pixel electrode is fixed, and average values of each color's Δu'v' based on a Macbeth chart of Example 3.
Figure 33:
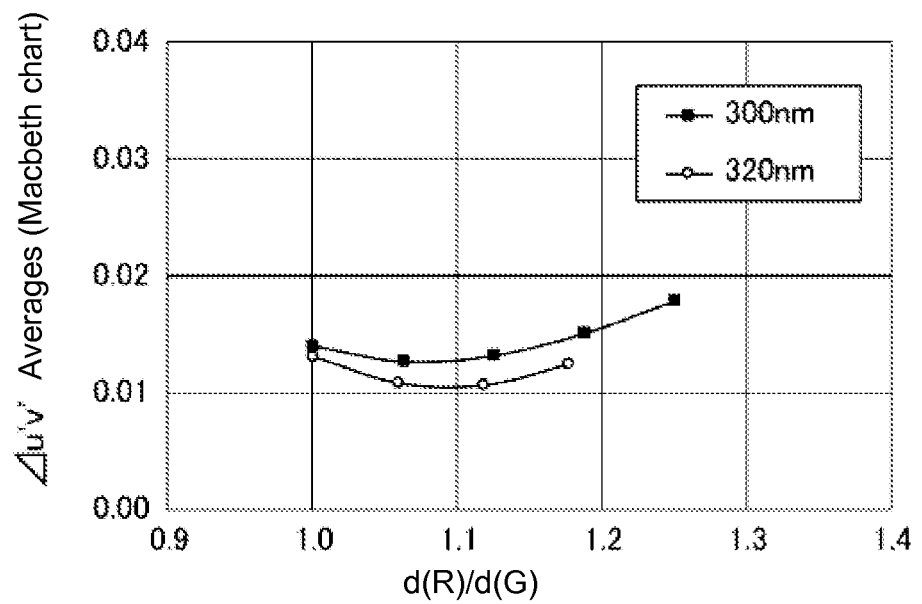
FIG. 33 is a graph showing relative relationships between a ratio of the liquid crystal layer thickness in a region corresponding to the red pixel electrode to the liquid crystal layer thickness in a region corresponding to the green pixel electrode when the liquid crystal layer thickness in a region corresponding to the blue pixel electrode is fixed, and average values of each color's Δu'v' based on a Macbeth chart of Example 4.
Figure 34:
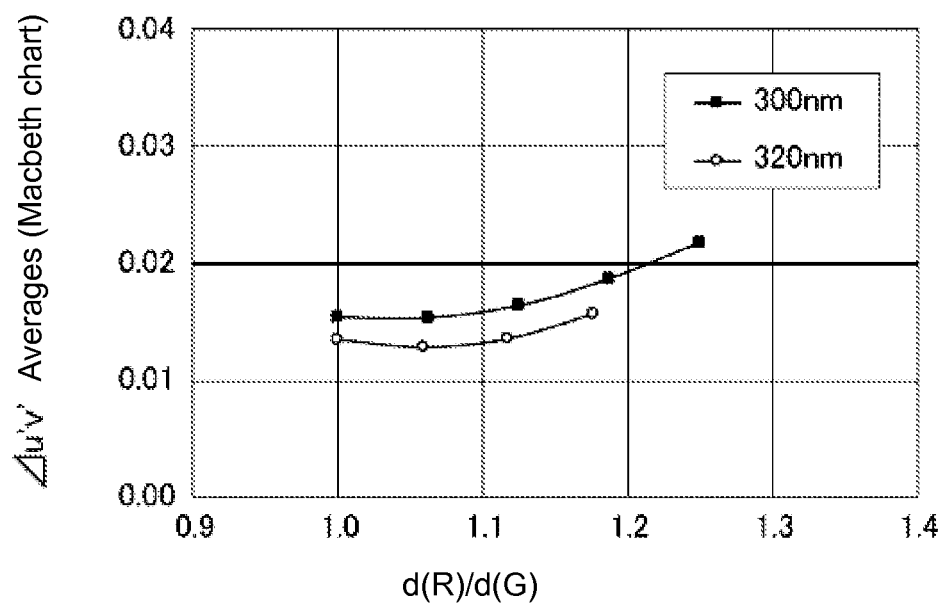
FIG. 34 is a graph showing relative relationships between a ratio of the liquid crystal layer thickness in a region corresponding to the red pixel electrode to the liquid crystal layer thickness in a region corresponding to the green pixel electrode when the liquid crystal layer thickness in a region corresponding to the blue pixel electrode is fixed, and average values of each color's Δu'v' based on a Macbeth chart of Example 5.

As a sample of the evaluation test, an evaluation was performed on the liquid crystal display panel of Example 3 having the d(B) divided by d(G) value of 0.88, the liquid crystal display panel of Example 4 having the d(B) divided by d(G) value of 0.82, and the liquid crystal display panel of Example 5 having the d(B) divided by d(G) value of 0.76, respectively. Here, the liquid crystal display panels of Examples 3 to 5 are examples of the liquid crystal display panel of Embodiment 2. FIGS. 32 to 35 are graphs showing relative relationships between the ratio of the liquid crystal layer thickness in the region corresponding to the red pixel electrode to the liquid crystal layer thickness in the region corresponding to the green pixel electrode when the liquid crystal layer thickness in the region corresponding to the blue pixel electrode is fixed, and average values of Δu'v' for the respective colors based on a Macbeth chart. FIG. 32 shows a result of the measurement of Example 3, FIG. 33 shows a result of the measurement of Example 4, and FIG. 34 shows a result of the measurement of Example 5, respectively.

As shown in FIG. 32, according to the liquid crystal display panel of Example 3, the average values of Δu'v' in the Macbeth chart became equal to or lower than 0.02 for all the ranges, but it was found that the average values of Δu'v' becomes equal to or lower than 0.015, which is more preferable, when the value of d(R) divided by d(G) is 1.09 to 1.13, and becomes even more preferable when the value of d(R) divided by d(G) is 1.11. Moreover, as seen in FIG. 32, a similar result was achieved even when the dΔn(G) value was set to either 300 nm or 320 nm.

As shown in FIG. 33, according to the liquid crystal display panel of Example 4, the average values of Δu'v' in the Macbeth chart became equal to or lower than 0.02 for all the ranges, but it was found that the average values of Δu'v' becomes equal to or lower than 0.015, which is more preferable, when the value of d(R) divided by d(G) is 1.07 to 1.11, and becomes even more preferable when the value of d(R) divided by d(G) is 1.09. Further, as shown in FIG. 33, a similar result was achieved even when the dΔn(G) value was set to either 300 nm or 320 nm.

As shown in FIG. 34, according to the liquid crystal display panel of Example 5, the average values of Δu'v' in the Macbeth chart became equal to or lower than 0.02 for all the ranges, but it was found that the average values of Δu'v' becomes equal to or lower than 0.015, which is more preferable, when the value of d(R) divided by d(G) is 1.05 to 1.09, and becomes even more preferable when the value of d(R) divided by d(G) is 1.07. Further, as seen in FIG. 34, a similar result was achieved even when the dΔn(G) value was set to either 300 nm or 320 nm.

Figure 35:
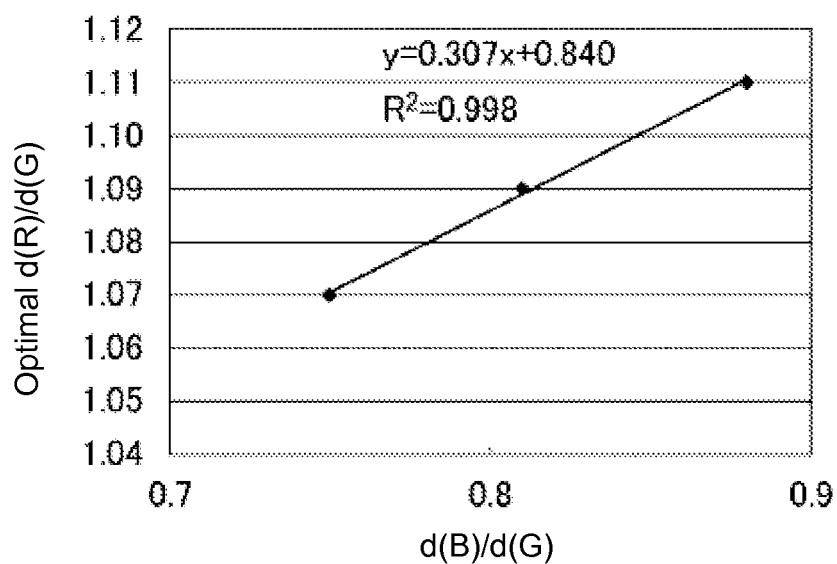
FIG. 35 is a graph showing a result of creating an approximate curve by plotting optimal values of d(R) divided by d(G) for values of d(B) divided by d(G).

Next, based on the results above, a preferable range for the liquid crystal layer thickness in the regions corresponding to the red, green and blue pixel electrodes was calculated. FIG. 35 is a graph showing a result of creating an approximate curve by plotting the optimal values of d(R) divided by d(G) for the values of d(B) divided by d(G). As shown in FIG. 35, a formula representing the obtained approximate curve was y=0.307x+0.840 (correlation coefficient $R^2$=0.998).

As a result, it was found that a preferable range for the liquid crystal layer thickness in the regions corresponding to the red, green and blue pixel electrodes was R:G:B=("0.3*d(B)+0.82" to "0.3*d(B)+0.86"):1:0.7 to 0.9, or more preferably, R:G:B="0.3*d(B)+0.84":1:0.7 to 0.9.

Evaluation Test 5

In order to verify improvement effects of display characteristics by a TIR, a liquid crystal display panel of Example 6 in which light is diffused by a TIR in directions in which no characteristic improvement effects by the two domain orientation division were achieved, and a liquid crystal display panel of the reference example 5 in which light is not diffused by the TIR in directions in which no effect by the two domain orientation division was achieved were manufactured, and then, a gamma characteristics change and a chromaticity change between when viewed in the front direction and when viewed in oblique directions were measured.

Figure 36:
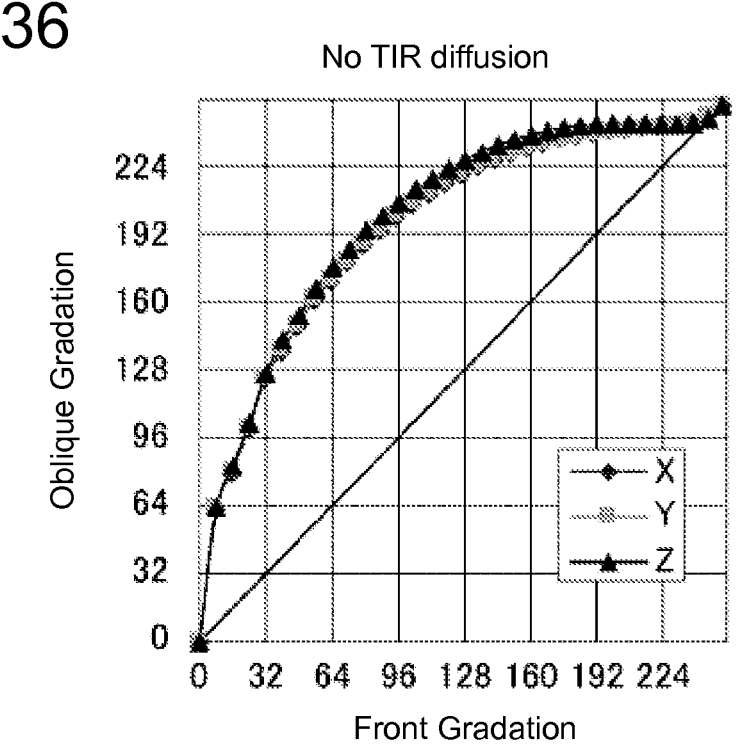
FIG. 36 is a graph showing relative relationships among the respective gradation values of X, Y and Z of a reference example 5 when viewed in the front direction and when viewed in an oblique direction (direction tilted 45° to the left or right from the front direction).
Figure 37:
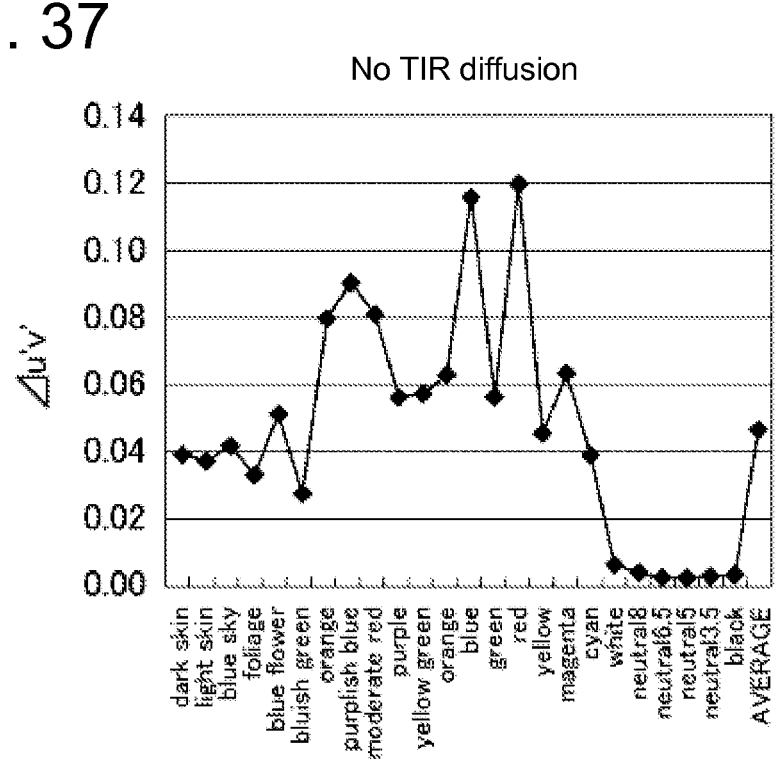
FIG. 37 is a graph showing values of the amount of each color's chromaticity change based on a Macbeth chart in the reference example 5, and their average values.
Figure 38:
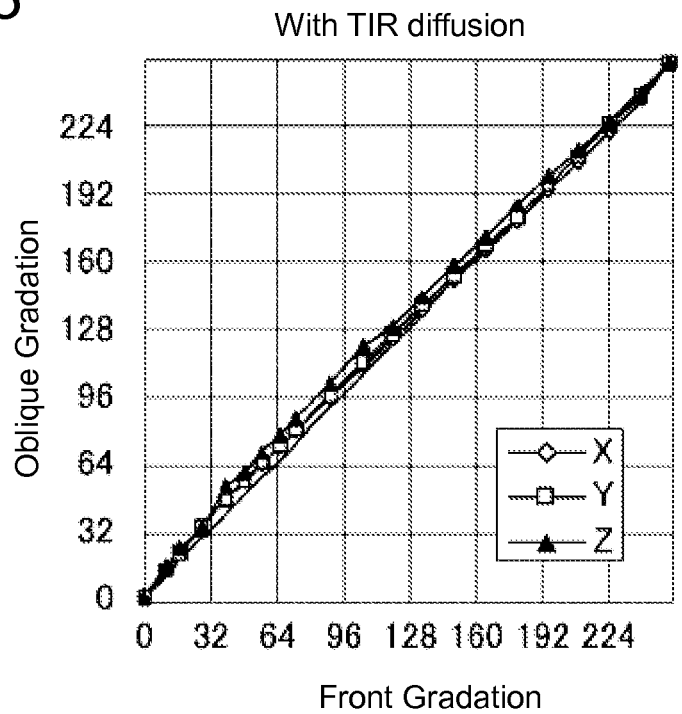
FIG. 38 is a graph showing relative relationships among the respective gradation values of X, Y and Z of Example 6 when viewed in the front direction and when viewed in an oblique direction (direction tilted 45° to the left or right from the front direction).
Figure 39:
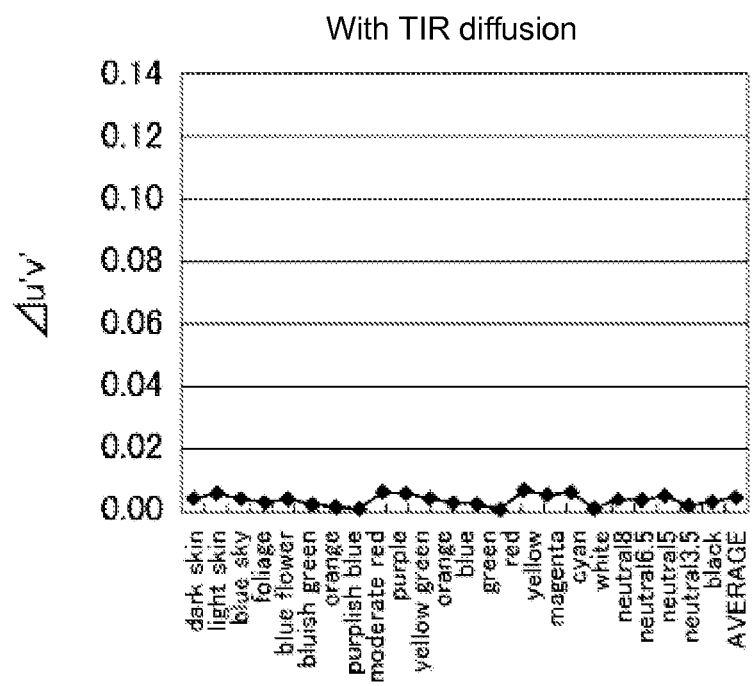
FIG. 39 is a graph showing values of the amount of each color's chromaticity change based on a Macbeth chart in Example 6, and their average values.

FIGS. 36 and 37 show a result of the measurement of the reference example 5, and FIGS. 38 and 39 show a result of the measurement of Example 6. FIGS. 36 and 38 are graphs showing relative relationships among the respective gradation values of X, Y and Z when viewed in the front direction and when viewed in oblique directions (direction tilted 45° upward, downward, left or right from the front direction). FIGS. 37 and 39 are graphs showing values of the amount of each color's chromaticity change based on a Macbeth chart, and their average values.

As seen in FIG. 36, when light is not diffused by a TIR, significant shifts in gradation value were seen for the gradation of all of X, Y and Z between the front gradation and the oblique gradation. Specifically, higher values were obtained in the oblique gradation between the front gradation and the oblique gradation. Moreover, as seen in FIG. 37, a significant change in the u'v' values was seen for most of the colors in the Macbeth chart.

In contrast, as seen in FIG. 38, when light is diffused by a TIR, shifts in the gradation values were significantly improved for the gradation of all of X, Y and Z between the front gradation and the oblique gradation. Moreover, as seen in FIG. 39, significant improvements were seen in a chromaticity change for most of the colors in the Macbeth chart of Example 6. Especially, the Δu'v' values became equal to or lower than 0.01 for almost all the colors, achieving a degree that a chromaticity change is hardly recognized between when viewed in the front direction and when viewed in oblique directions.

Furthermore, Example 6 having only one TIR was able to greatly improve lowering of the front luminance and lowering of the front contrast, and also to achieve a good display in which the occurrence of a blurred image and moire is hardly recognized compared to when two TIRs are formed.

The present application claims priority of Japanese Patent Application 2009-016503 filed on Jan. 28, 2009, based on the regulations of Paris Convention or other laws of the countries that are entered. The entire content of that application is hereby incorporated by reference in the present application.

DESCRIPTION OF REFERENCE CHARACTERS

10: active matrix substrate
11: pixel electrode
11R: red pixel electrode
11G: green pixel electrode
11B: blue pixel electrode
12: slit (on pixel electrodes)
13, 23: supporting substrates
14, 24: polarizing plates
20: color filter substrate
21: ribs
22: color filter
22R: red color filter
22G: green color filter
22B: blue color filter
25: common electrode
26: slit (on common electrode)
41: TIR (vertical direction)
42: TIR (horizontal direction)

50: liquid crystal layer
51: liquid crystal molecule
62: gate signal wire
63: source signal wire
64: TFT
71: first region
72: second region
81: transparent high refractive index resin
82: black low refractive index resin
83: lens part
84: absorber part

The invention claimed is:

1. A liquid crystal display panel, comprising:
a pair of substrates, at least one of which includes a plurality of pixel electrodes including red, green and blue pixel electrodes; and
a liquid crystal layer disposed between said pair of substrates,
wherein for each pixel, said liquid crystal layer is divided into a first region and a second region that have liquid crystal molecules different in directions of inclination from each other,
wherein when voltage equal to or higher than a threshold is applied, liquid crystal molecules positioned in said first region and liquid crystal molecules positioned in said second region are both oriented either vertically or horizontally when said pair of substrates is viewed in a front direction, and are oriented in directions oblique to a substrate surface and symmetrically to each other when said pair of substrates is viewed in a cross-sectional direction, and
wherein said liquid crystal layer has a smaller thickness in a region corresponding to the blue pixel electrode than in a region corresponding to the green pixel electrode and in a region corresponding to the red pixel electrode.

2. The liquid crystal display panel according to claim 1,
wherein said liquid crystal layer has a smaller thickness in the region corresponding to the green pixel electrode than in the region corresponding to the red pixel electrode.

3. The liquid crystal display panel according to claim 1,
wherein when said pair of substrates is viewed in the front direction, liquid crystal molecules in said liquid crystal layer are oriented in vertical directions, and
wherein a shape of said pixel electrode is longer in a horizontal direction than in a vertical direction.

4. The liquid crystal display panel according to claim 1,
wherein when said pair of substrates is viewed in the front direction, liquid crystal molecules of said liquid crystal layer are oriented in horizontal directions, and
wherein a shape of said pixel electrode is longer in a vertical direction than in a horizontal direction.

5. The liquid crystal display panel according to claim 1,
wherein when said pair of substrates is viewed in the front direction, liquid crystal molecules in said liquid crystal layer are oriented in vertical directions, and
wherein said liquid crystal display panel includes a diffusion sheet to block light incident from oblique directions to a substrate surface and to guide light incident from a direction perpendicular to the substrate surface in vertical directions.

6. The liquid crystal display panel according to claim 1,
wherein when said pair of substrates is viewed in the front direction, liquid crystal molecules of said liquid crystal layer are oriented in horizontal directions, and
wherein said liquid crystal display panel includes a diffusion sheet to block light incident from oblique directions to a substrate surface and to guide light incident from a direction perpendicular to the substrate surface in horizontal directions.

7. The liquid crystal display panel according to claim 1,
wherein said liquid crystal layer thickness is set such that a value of a liquid crystal layer thickness in the region corresponding to the blue pixel electrode d(B) divided by a liquid crystal layer thickness in the region corresponding to the green pixel electrode d(G) is 0.7 to 0.9.

8. The liquid crystal display panel according to claim 1,
wherein said liquid crystal layer thickness is set such that a value of a liquid crystal layer thickness in the region corresponding to the blue pixel electrode d(B) divided by a liquid crystal layer thickness in the region corresponding to the red pixel electrode d(R) is 0.7 to 0.9.

9. The liquid crystal display panel according to claim 1,
wherein said liquid crystal layer thickness is set such that a liquid crystal layer thickness in the region corresponding to the blue pixel electrode d(B): a liquid crystal layer thickness in the region corresponding to the green pixel electrode d(G): a liquid crystal layer thickness in the region corresponding to the red pixel electrode d(R) satisfies 0.7 to 0.9:1:(0.3*d(B)+0.82) to (0.3*d(B)+0.86O).

\* \* \* \* \*